United States Patent
Choi et al.

(10) Patent No.: US 11,783,617 B2
(45) Date of Patent: Oct. 10, 2023

(54) PIXEL CIRCUIT COMPRISING OPTICAL FINGERPRINT SENSING CIRCUIT, METHOD FOR DRIVING PIXEL CIRCUIT, AND ORGANIC LIGHT-EMITTING DISPLAY DEVICE

(71) Applicants: LG Display Co., Ltd., Seoul (KR); Industry-University Cooperation Foundation Hanyang University, Seoul (KR)

(72) Inventors: Byong Deok Choi, Seoul (KR); Yong Sang Yoo, Seoul (KR); Yong Duck Kim, Seoul (KR); Jeongmin Moon, Paju-si (KR); Soonshin Jung, Paju-si (KR); Moonbong Song, Paju-si (KR); Kiseok Chang, Paju-si (KR); Jihwan Jung, Paju-si (KR)

(73) Assignees: LG Display Co., Ltd., Seoul (KR); Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 17/296,856

(22) PCT Filed: Jun. 3, 2019

(86) PCT No.: PCT/KR2019/006645
§ 371 (c)(1),
(2) Date: May 25, 2021

(87) PCT Pub. No.: WO2020/141663
PCT Pub. Date: Jul. 9, 2020

(65) Prior Publication Data
US 2022/0005408 A1    Jan. 6, 2022

(30) Foreign Application Priority Data
Dec. 31, 2018    (KR) .................. 10-2018-0173480

(51) Int. Cl.
*G06V 40/13*    (2022.01)
*G09G 3/3208*    (2016.01)
*G09G 3/3233*    (2016.01)

(52) U.S. Cl.
CPC ....... *G06V 40/1318* (2022.01); *G09G 3/3208* (2013.01); *G09G 3/3233* (2013.01); *G09G 2300/0809* (2013.01)

(58) Field of Classification Search
CPC ......... G09G 3/3208; G09G 2300/0809; G09G 2310/0262; G09G 2354/00; G09G 3/3233;
(Continued)

(56) References Cited

U.S. PATENT DOCUMENTS 9,704,011 B2    7/2017    Yang et al.
9,916,793 B2    3/2018    Kozuma et al.
(Continued)

FOREIGN PATENT DOCUMENTS

JP    2005-148285 A    6/2005
JP    2013-069201 A    4/2013
(Continued)

OTHER PUBLICATIONS

PCT International Search Report, PCT/KR2019/006645, dated Sep. 19, 2019, 4 Pages.
Korean Intellectual Property Office, Office Action, KR Patent Application No. 10-2018-0173480, dated Jan. 18, 2023, eight pages.

*Primary Examiner* — Premal R Patel
(74) *Attorney, Agent, or Firm* — Fenwick & West LLP

(57) ABSTRACT

Disclosed are a pixel circuit comprising an optical fingerprint sensing circuit, a method of driving a pixel circuit comprising an optical fingerprint sensing circuit, and a display device comprising a pixel circuit comprising an optical fingerprint sensing circuit. According to the present disclosure, the pixel circuit comprising an optical fingerprint
(Continued)

sensing circuit comprises a pixel control circuit, the pixel control circuit comprising: a first photodetector which receives a light and generates a first signal; a second photodetector which receives a light and generates a second signal; and a self-illuminator which receives differential signals of the first signal and second signal and outputs an output signal, includes at least one transistor component and at least one capacitor component, and outputs a light on the basis of a data signal.

19 Claims, 11 Drawing Sheets

(58) Field of Classification Search
CPC ......... G09G 2300/046; G06V 40/1318; G06K 9/00
See application file for complete search history.

(56) References Cited

U.S. PATENT DOCUMENTS

| | | | |
|---|---|---|---|
| 2011/0043471 A1* | 2/2011 | Senda | G06F 3/042 345/173 |
| 2013/0321366 A1* | 12/2013 | Kozuma | G06F 3/0412 345/204 |
| 2016/0042216 A1 | 2/2016 | Yang et al. | |
| 2017/0083738 A1 | 3/2017 | Park et al. | |
| 2017/0289805 A1* | 10/2017 | Hong | G09G 3/3233 |
| 2018/0357459 A1* | 12/2018 | Ling | G06F 3/0421 |
| 2019/0180071 A1* | 6/2019 | Kim | G06V 40/1359 |
| 2019/0384960 A1* | 12/2019 | Kwon | H01L 27/3213 |

FOREIGN PATENT DOCUMENTS

| | | |
|---|---|---|
| KR | 10-2013-0135764 A | 12/2013 |
| KR | 10-1718476 | 3/2017 |
| KR | 10-2017-0136692 A | 12/2017 |

\* cited by examiner

PIXEL CIRCUIT COMPRISING OPTICAL FINGERPRINT SENSING CIRCUIT, METHOD FOR DRIVING PIXEL CIRCUIT, AND ORGANIC LIGHT-EMITTING DISPLAY DEVICE

FIELD

The present disclosure relates to a pixel circuit including an optical fingerprint sensing circuit, a method for driving a pixel circuit including the optical fingerprint sensing circuit, and a display device including the pixel circuit including the optical fingerprint sensing circuit.

The present application is a 35 U.S.C 371 Patent Application of PCT Application No. PCT/KR2019/006645, filed on Jun. 3, 2019 which claims the benefit of priority to Korean Patent Application No. 10-2018-0173480, filed on Dec. 31, 2018, each of which is incorporated herein by reference

DESCRIPTION OF THE RELATED ART

An image display device is currently being used in computer-based systems such as a laptop computer, a tablet PC, a smart phone, a personal digital assistant (PDA), an automated teller machine, and a search guidance system. These systems store usually not only personal information related to personal privacy but also a lot of confidential data such as business information or trade secret. There is a necessity of enhancing security in order to protect these data.

A fingerprint can be used as a way to enhance security. As a fingerprint of a finger is used in the computer-based systems, active research is being devoted to an image display device including a finger identification device, which is expected to be widely used in smart phones.

In general, the image display device including a fingerprint sensing circuit identifies fingerprints in an optical sensing manner or a capacitive manner.

An image display device that identifies a fingerprint in an optical sensing manner is provided with a fingerprint identification circuit including a light-receiving element as a fingerprint sensor on a display panel. The light-receiving element senses light emitted from the display panel and reflected by the fingerprint and generates a photocurrent. Here, the amount of the photocurrent generated from the light-receiving element varies depending on whether the object reflecting the light is a ridge or a valley of the fingerprint. The fingerprint identification circuit identifies the form of the fingerprint through the amount of change in the photocurrent.

SUMMARY

Technical Problem

In order to identify a fingerprint in an optical sensing manner, a fingerprint identification circuit having, for example, a high resolution of 500 PPI or higher is required.

The inventors of the present invention have recognized that it is necessary to remove repetitive elements between the fingerprint identification circuit and a pixel circuit and to integrate the fingerprint identification circuit and the pixel circuit, for the purpose of the development of the fingerprint identification circuit having a high resolution.

When the pixel circuit and the fingerprint identification circuit are integrated, since a distance between the pixel circuit and the fingerprint identification circuit is small, a large amount of light emitted from a self-light emitting element may not reach the fingerprint and may be reflected from glass or electrodes and then return to a light-receiving element of the pixel circuit. Also, the light-receiving element may receive light incident from the outside of a display device, for example, sunlight or light of an indoor lighting equipment. When such direct light is incident on the fingerprint identification circuit, the light-receiving element may not recognize correctly the light reflected by the fingerprint because the amount of the direct light may be larger than the amount of the fingerprint light. Finally, there occurs a problem that a fingerprint identification rate of the fingerprint identification circuit is reduced. The inventors of the present invention have researched in order to overcome the foregoing problems.

Here, the present disclosure is designed to address the above-mentioned problems and provides an integrated pixel circuit which identifies fingerprints without being affected by direct light that is not reflected by the fingerprints.

Technical Solution

One embodiment is a pixel circuit including an optical fingerprint sensing circuit. The pixel circuit includes: a self-light emitting element which displays an image; a light-receiving element which receives light emitted from the self-light emitting element and reflected from a fingerprint of a user and converts it into a photocurrent; and a pixel control circuit. The light-receiving element includes a first light-receiving element which generates a first signal and a second light-receiving element which generates a second signal. The pixel control circuit generates an output signal by calculating the first signal and the second signal and includes at least one transistor component and at least one capacitor component.

The pixel control circuit differentiates the first signal and the second signal and thus generates the output signal where a noise signal has been removed.

The pixel control circuit further includes a first transistor, a second transistor, a third transistor, a fourth transistor, a fifth transistor, a sixth transistor, a seventh transistor, a first capacitor, and a second capacitor. A first terminal of the first transistor is connected to a data line, a second terminal of the first transistor is connected to a first node, and a gate terminal of the first transistor is connected to an n-th scan line. A first terminal of the second transistor is connected to a second node, a second terminal of the second transistor is connected to a third node, and a gate terminal of the second transistor is connected to a fourth node. A first terminal of the third transistor is connected to the fourth node, a second terminal of the third transistor is connected to the third node, and a gate terminal of the third transistor is connected to an (n−1)-th scan line. A first terminal of the fourth transistor is connected to the first node, a second terminal of the fourth transistor is connected to a cathode terminal of the second light-receiving element, and a gate terminal of the fourth transistor is connected to a first sensing line. A first terminal of the fifth transistor is connected to an anode terminal of the first light-receiving element, a second terminal of the fifth transistor is connected to the first node, and a gate terminal of the fifth transistor is connected to the first sensing line. A first terminal of the sixth transistor is connected to the third node, a second terminal of the sixth transistor is grounded, and a gate terminal of the sixth transistor is connected to the first sensing line. A first terminal of the seventh transistor is connected to the second node, a second terminal of the seventh transistor is connected to an output line, and a gate terminal of the seventh transistor is connected to a second sensing line. A first terminal of the first capacitor is connected to the first node, and a second terminal of the first capacitor is connected to the fourth node. A first terminal of the second capacitor is connected to the first node, and a second terminal of the second capacitor is grounded. A cathode terminal of the first light-receiving element is connected to a power supply VDD, and the second light-receiving element is grounded.

The pixel control circuit further includes an eighth transistor, a ninth transistor, and a tenth transistor. A first terminal of the eighth transistor is connected to the power supply VDD, a second terminal of the eighth transistor is connected to the first node, and a gate terminal of the eighth transistor is connected to the (n−1)-th scan line. A first terminal of the ninth transistor is connected to the power supply, a second terminal of the ninth transistor is connected to the second node, and a gate terminal of the ninth transistor is connected to a first emission line. A first terminal of the tenth transistor is connected to the third node, a second terminal of the tenth transistor is connected to an anode terminal of the self-light emitting element, and a gate terminal of the tenth transistor is connected to a second emission line. A cathode terminal of the self-light emitting element is grounded.

The pixel control circuit further includes a first transistor, a second transistor, a third transistor, a fourth transistor, a fifth transistor, a sixth transistor, and a seventh transistor. A first terminal of the first transistor is connected to a data line, a second terminal of the first transistor is connected to a first node, and a gate terminal of the first transistor is connected to an n-th scan line. A first terminal of the second transistor is connected to the first node, a second terminal of the second transistor is connected to a second node, and a gate terminal of the second transistor is connected to a third node. A first terminal of the third transistor is connected to the third node, a second terminal of the third transistor is connected to the second node, and a gate terminal of the third transistor is connected to the (n−1)-th scan line. A first terminal of the fourth transistor is connected to the third node, a second terminal of the fourth transistor is connected to a cathode terminal of the second light-receiving element, and a gate terminal of the fourth transistor is connected to a first sensing line. A first terminal of the fifth transistor is connected to an anode terminal of the first light-receiving element, a second terminal of the fifth transistor is connected to the third node, and a gate terminal of the fifth transistor is connected to the first sensing line. A first terminal of the sixth transistor is connected to the second node, a second terminal of the sixth transistor is grounded, and a gate terminal of the sixth transistor is connected to the first sensing line. A first terminal of the seventh transistor is connected to the first node, a second terminal of the seventh transistor is connected to an output line, and a gate terminal of the seventh transistor is connected to a second sensing line. A cathode terminal of the first light-receiving element is connected to a power supply VDD, and an anode terminal of the second light-receiving element is grounded.

The pixel control circuit further includes an eighth transistor, a ninth transistor, a tenth transistor, and an eleventh transistor. A first terminal of the eighth transistor is connected to an initialization line, a second terminal of the eighth transistor is connected to the third node, and a gate terminal of the eighth transistor is connected to an (n−1)-th scan line. A first terminal of the ninth transistor is connected to the initialization line, a second terminal of the ninth transistor is connected to an anode terminal of the self-light emitting element, and a gate terminal of the ninth transistor is connected to the (n−1)-th scan line. A first terminal of the tenth transistor is connected to the power supply, a second terminal of the tenth transistor is connected to the first node, and a gate terminal of the tenth transistor is connected to an emission line. A first terminal of the eleventh transistor is connected to the second node, a second terminal of the eleventh transistor is connected to the anode terminal of the self-light emitting element, and a gate terminal of the eleventh transistor is connected to the emission line. A first terminal of the capacitor is connected to the power supply, and a second terminal of the capacitor is connected to the third node. A cathode terminal of the self-light emitting element is grounded.

The pixel control circuit further incudes a first transistor, a second transistor, a third transistor, a fourth transistor, a fifth transistor, and a sixth transistor. A first terminal of the first transistor is connected to a data line, a second terminal of the first transistor is connected to a first node, and a gate terminal of the first transistor is connected to an n-th scan line. A first terminal of the second transistor is connected to a second node, a second terminal of the second transistor is connected to a third node, and a gate terminal of the second transistor is connected to the first node. A first terminal of the third transistor is connected to the first node, a second terminal of the third transistor is connected to a cathode terminal of the second light-receiving element, and a gate terminal of the third transistor is connected to a first sensing line. A first terminal of the fourth transistor is connected to an anode terminal of the first light-receiving element, a second terminal of the fourth transistor is connected to the first node, and a gate terminal of the fourth transistor is connected to the first sensing line. A first terminal of the fifth transistor is connected to the third node, a second terminal of the fifth transistor is grounded, and a gate terminal of the fifth transistor is connected to the first sensing line. A first terminal of the sixth transistor is connected to the second node, a second terminal of the sixth transistor is connected to an output line, and a gate terminal of the sixth transistor is connected to a second sensing line. A cathode terminal of the first light-receiving element is connected to a power supply VDD, and an anode terminal of the second light-receiving element is grounded.

The pixel control circuit further includes a seventh transistor. A first terminal of the seventh transistor is connected to the power supply, a second terminal of the seventh transistor is connected to the second node, and a gate terminal of the seventh transistor is connected to an emission line. A first terminal of the capacitor is connected to the power supply, and a second terminal of the capacitor is connected to the first node. An anode terminal of the self-light emitting element is connected to the third node, and a cathode terminal of the self-light emitting element is grounded.

Advantageous Effects

According to the present disclosure, since the output voltage can be maintained around VREF/2 on the basis of the first light-receiving element for charging or the second light-receiving element for discharging, it is possible to prevent the output voltage of the pixel circuit from being clipped.

Also, according to the present disclosure, the fingerprint is sensed by using a differential signal, i.e., a difference between current flowing in common through the first light-receiving element and the second light-receiving element, so that the effect of a signal, i.e., noise, that is generated from light by a self-light emitting element or light from the outside can be reduced and a clipping phenomenon can be prevented.

DETAILED DESCRIPTION

Figure 1:
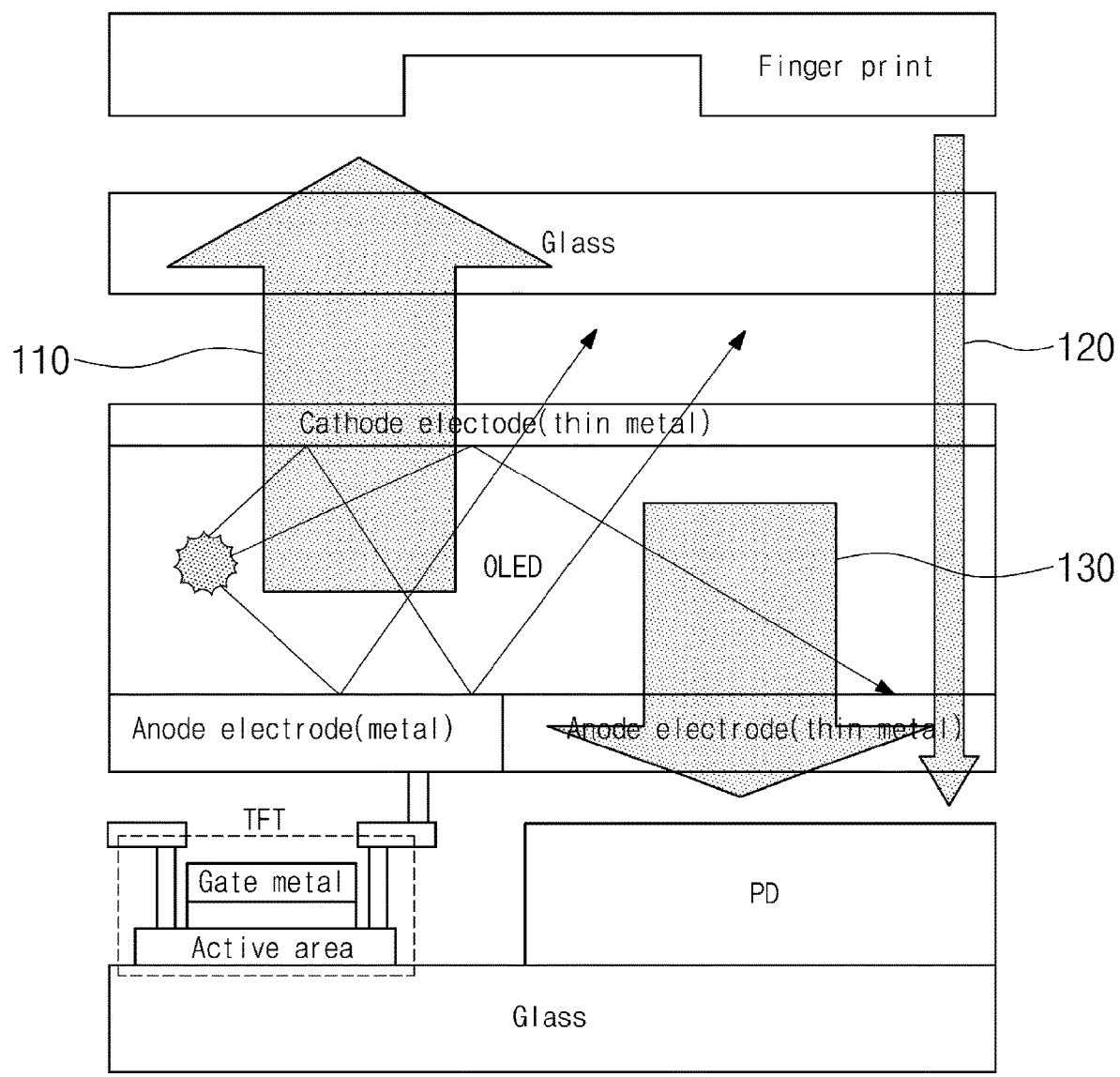
FIG. 1 shows a cross section of a circuit including a self-light emitting element and a light-receiving element.

The features, advantages and method for accomplishment of the disclosed embodiment will be more apparent from referring to the following embodiments described as well as the accompanying drawings. However, the present disclosure is not limited to the embodiment to be disclosed below and can be implemented in different and various forms. The embodiments bring about the complete disclosure of the present invention and are only provided to make those skilled in the art fully understand the scope of the present invention.

According to an embodiment of the present disclosure, a "part" can be implemented as a processor and/or a memory. The term "processor" is to be construed broadly to include general purpose processors, central processing units (CPUs), microprocessors, digital signal processors (DSPs), controllers, microcontrollers, state machines, and the like. In some circumstances, a "processor" may refer to an application specific integrated circuit (ASIC), programmable logic device (PLD), field programmable gate array (FPGA), and the like. The term "processor" refers to a combination of processing devices, for example, a combination of the DSP and the microprocessor, a combination of a plurality of microprocessors, a combination of one or more microprocessors combined with a DSP core, or a combination of any other such configurations.

The term "memory" should be construed broadly to include any electronic component capable of storing electronic information. The term memory refers to various types of processor-readable media such as random-access memory (RAM), read-only memory (ROM), non-volatile random-access memory (NVRAM), programmable read-only memory (PROM), erase-programmable read-only memory (EPROM), electrically erasable PROM (EEPROM), flash memory, magnetic or optical data storage, registers, and the like. The memory is said to be in electronic communication with the processor if the processor is able to read information from the memory and/or to write information to the memory. The memory integrated in the processor is in electronic communication with the processor.

The term "signal" means an electrical signal of a voltage or a current.

Hereinafter, embodiments will be described in detail with reference to the accompanying drawings such that that those of ordinary skill in the art can easily implement the embodiments. Also, in the drawings, parts irrelevant to the description may be omitted in order to clearly describe the present disclosure.

FIG. 1 shows a cross section of a circuit including a self-light emitting element and a light-receiving element.

The self-light emitting element may include an electroluminescence element, an OLED, a quantum dot-LED (QD-LED), a Micro-LED, and the like. The light-receiving element PD may be, for example, a photodiode.

As shown in FIG. 1, when a pixel circuit and a fingerprint identification circuit are integrated, a distance between the pixel circuit and the fingerprint identification circuit may be small. Due to such a structure of a display panel, the light-receiving element PD may receive not only light 120 reflected by a fingerprint, but also light 110 which is emitted from the self-light emitting element and is reflected from glass or electrodes without reaching the fingerprint. Also, the light-receiving element PD may receive light (not shown in the drawing) from the outside of a display device.

In the following description, the light reflected from glass or electrodes and the light coming from the outside of the display device are referred to as "direct light". Also, the light reflected by the fingerprint is called "fingerprint light".

When such direct light 130 is incident on the fingerprint identification circuit, since the amount of the direct light 130 may be greater than the amount of the fingerprint light 120, the light-receiving element may not identify correctly the light reflected by the fingerprint, and finally there occurs a problem that the fingerprint identification rate of the fingerprint identification circuit is reduced.

Figure 2:
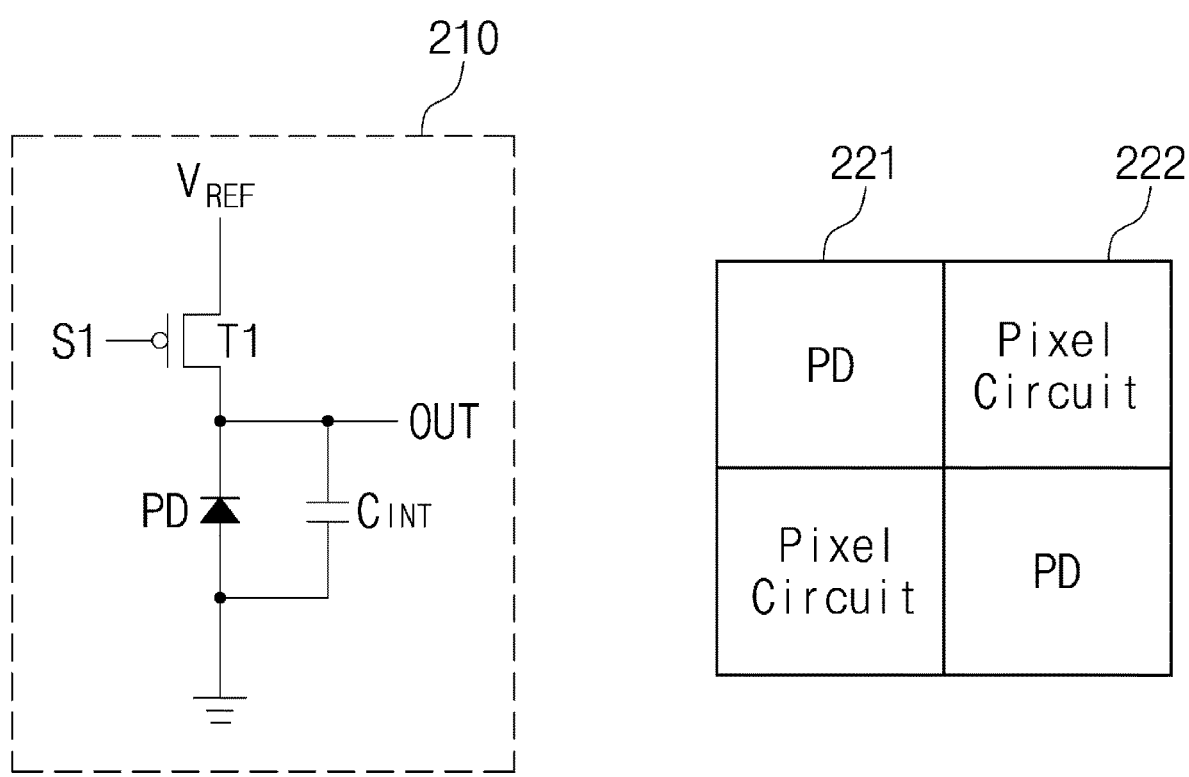
FIG. 2 shows a pixel circuit according to a prior art.

FIG. 2 shows a pixel circuit according to a prior art.

A pixel circuit 210 shows a case in which the pixel circuit and the fingerprint identification circuit are integrated. The pixel circuit 210 may include one light-receiving element, at least one transistor component T1, and at least one capacitor component CINT. The pixel circuit 210 may be disposed on the display panel. For example, the light-receiving element of the pixel circuit 210 may be disposed at a first position 221. Also, the remaining portion of the pixel circuit 210 may be disposed at a second position 222. One pixel circuit 210 includes one light-receiving element, and the light-receiving element receives the light by the self-light emitting element, the light from the outside, and the light reflected from the fingerprint.

The light from the outside may represent sunlight or light generated from the outside of the display device such as a fluorescent lamp. Also, the light by the self-light emitting element may represent the light generated by the self-light emitting element or the light by the self-light emitting element which has been reflected from the glass, electrodes, etc., of the display panel not by the fingerprint. The light reflected from the fingerprint may represent the light of the self-light emitting element or the light from the outside, which has been reflected by and emitted from the fingerprint.

The light of the self-light emitting element and the light from the outside may be stronger than the light reflected from the fingerprint. Therefore, the pixel circuit 210 may have difficulty in identifying the fingerprint by using the light reflected from the fingerprint. In particular, the more the pixel circuit 210 is integrated within the same area, the greater the influence of the light by the self-light emitting element, and thus the fingerprint identification rate of the pixel circuit 210 may decrease.

Figure 3:
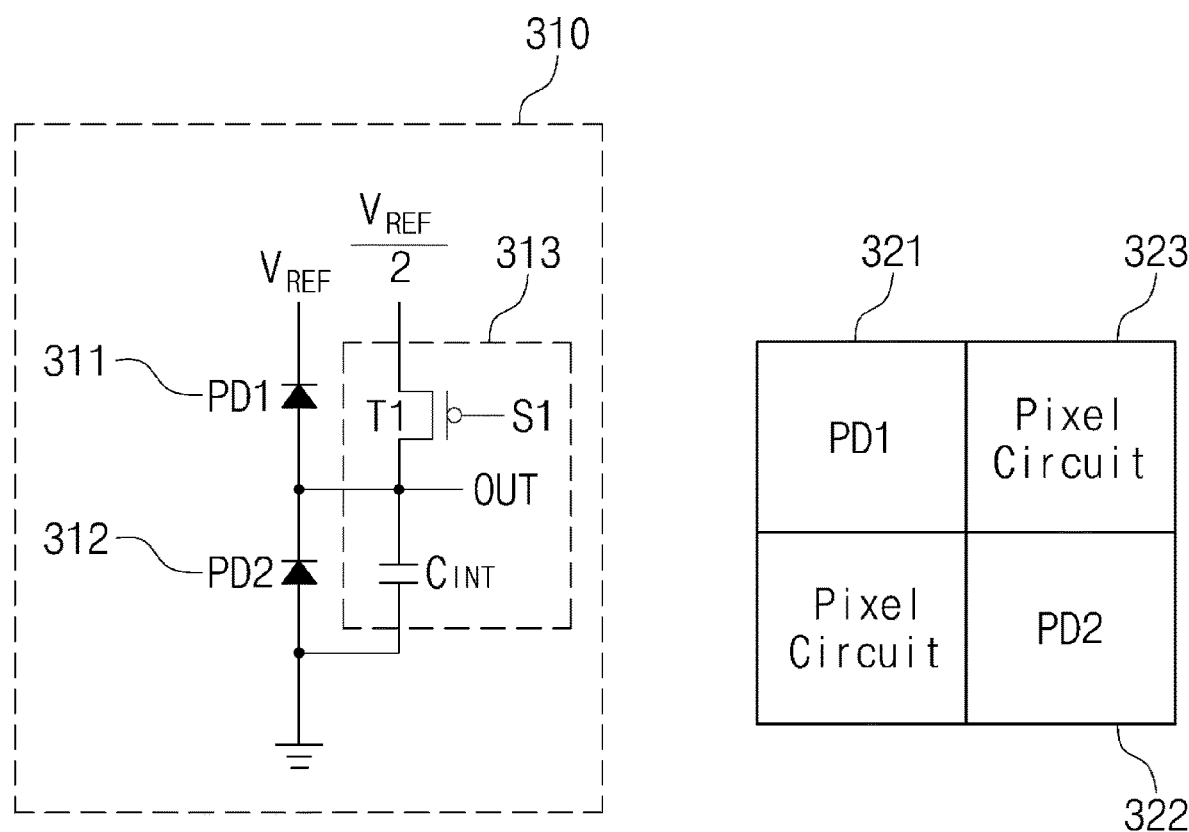
FIG. 3 shows a pixel circuit according to an embodiment of the present disclosure.

FIG. 3 shows a pixel circuit according to an embodiment of the present disclosure.

A pixel circuit 310 including an optical fingerprint sensing circuit may include a first light-receiving element 311 and a second light-receiving element 312, and a pixel control circuit 313.

The light-receiving element converts the light emitted from the self-light emitting element and reflected from a finger of a user into a photocurrent in a reverse direction. Here, the amount of the photocurrent generated from the light-receiving element varies depending on whether the object reflecting the light is a ridge or a valley of the fingerprint. Here, the photocurrent caused by the light reflected from the valley may be greater than the photocurrent caused by the light reflected from the ridge. However, the present invention is not limited thereto, and the photocurrent caused by the light reflected from the valley may be less than or equal to the photocurrent caused by the light reflected from the ridge.

The first light-receiving element may receive light and generate a first signal. The second light-receiving element may receive light and generate a second signal. The first light-receiving element 311 may charge a capacitor component CINT of the pixel control circuit 313. The second light-receiving element 312 may discharge the capacitor component CINT of the pixel control circuit 313. The capacitor component CINT may be charged by the first signal and discharged by the second signal. When the first signal is greater than the second signal, a differential signal may flow to the pixel control circuit 313. When the first signal is smaller than the second signal, the differential signal may flow from the pixel control circuit 313 toward a photodiode. When the first signal is greater than the second signal, the capacitor component CINT may be charged. When the first signal is smaller than the second signal, the capacitor component CINT may be discharged.

The pixel control circuit 313 may receive the differential signal between the first signal and the second signal. Also, the pixel control circuit 313 may output an output signal to an output line OUT on the basis of the differential signal.

For convenience of description, the pixel control circuit 313 of FIG. 3 is shown schematically. The pixel control circuit 313 may include at least one transistor component T1 and at least one capacitor component CINT. The transistor component T1 represents a component that is turned on/off according to a predetermined signal S1. The pixel control circuit 313 may reset an output voltage OUT of the pixel circuit 310 through a switching operation of the transistor component T1. When the transistor component T1 is turned on, the output voltage OUT is reset to VREF/2. The capacitor component CINT represents a component that generates a current when the voltage changes. The transistor component T1 and the capacitor component CINT of the pixel control circuit 313 may be implemented by using at least one of a transistor and a capacitor.

The pixel control circuit 313 may include a self-light emitting element (not shown). The self-light emitting element may output light on the basis of a data signal. The self-light emitting element emits light according to an incoming current on the basis of the data signal. Taking an organic light-emitting diode (OLED) as an example, the self-light emitting element includes an organic light-emitting cell formed between an anode electrode and a cathode electrode. Here, the organic light-emitting cell may be formed to have a structure of a hole transport layer/organic light-emitting layer/electron transport layer or a structure of a hole injection layer/hole transport layer/organic light-emitting layer/electron transport layer/electron injection layer. Also, a functional layer for improving the light emission efficiency and/or lifetime of the organic light-emitting layer may be additionally formed in the organic light-emitting cell.

The pixel circuit 310 may be disposed on the display panel. The display panel may include a plurality of pixel circuits. For example, the first light-receiving element 311 of the pixel circuit 310 may be included in a first region 321. The second light-receiving element 312 of the pixel circuit 310 may be included in a second region 322. The pixel control circuit 313 of the pixel circuit 310 or a portion of the pixel control circuit 313 may be included in a third region 323. For example, the self-light emitting element may be included in the third region 323.

The first region 321 including the first light-receiving element 311 and the second region 322 including the second light-receiving element 312 may be close. Accordingly, the light by the self-light emitting element or the light from the outside may have the same effect on the first light-receiving element 311 and the second light-receiving element 312. Accordingly, the first light-receiving element 311 and the second light-receiving element 312 may generate the same current on the basis of the light by the self-light emitting element or the light from the outside.

Fingerprint identification may be performed by that the light-receiving elements sense the light reflected from fine valleys and ridges of the fingerprint. Accordingly, the light reflected from the fingerprint received by the first light-receiving element 311 may be different from the light reflected from the fingerprint received by the second light-receiving element 312. Also, the first light-receiving element 311 and the second light-receiving element 312 may generate currents having different magnitudes on the basis of the light reflected from the fingerprint.

As described above, the light of the self-light emitting element or the light from the outside has the same effect on the first light-receiving element 311 and the second light-receiving element 312. On the other hand, the light reflected from the fingerprint has different effects on the first light-receiving element 311 and the second light-receiving element 312. Accordingly, the pixel circuit 310 including the optical fingerprint sensing circuit can accurately identify the fingerprint by using a difference between the current of the first light-receiving element 311 and the current of the second light-receiving element 312.

For example, a differential current between the current of the first light-receiving element 311 and the current of the second light-receiving element 312 may be output to the pixel control circuit 313. The pixel control circuit 313 may output a current or voltage based on the differential current to the output line OUT. A system including the pixel circuit 310 can accurately identify the fingerprint on the basis of the output signal output to the output line OUT.

According to the conventional pixel circuit 210 of FIG. 2, the output voltage may be clipped to VREF or VSS (source voltage of T1).

Clipping means that an input signal greater than a reference passes through the circuit and operates in a saturation portion of input/output characteristics so that the waveform of the output signal is cut off and the output signal is distorted.

As described above, the direct light that is not reflected by the fingerprint may generate an excessive photocurrent in the light-receiving element PD because the amount of the direct light is very large. When the light-receiving element PD is for charging, this excessive photocurrent can charge the capacitor component CINT with a high voltage within a short period of time, so that the output voltage may be clipped to VREF. As the output voltage is clipped to VREF, the output signal is distorted, and as a result, the conventional pixel circuit 210 cannot accurately identify the fingerprint.

However, the pixel circuit 310 according to the embodiment of FIG. 3 includes two light-receiving elements, i.e., the first light-receiving element 311 for charging and the second light-receiving element 312 for discharging. Therefore, the output voltage can be maintained around VREF/2. That is, there is an effect of preventing the output voltage of the pixel circuit 310 from being clipped.

The current flowing through the first light-receiving element 311 and the second light-receiving element 312 and the principle of preventing the clipping phenomenon will be described in detail with reference to FIG. 5.

Figure 4:
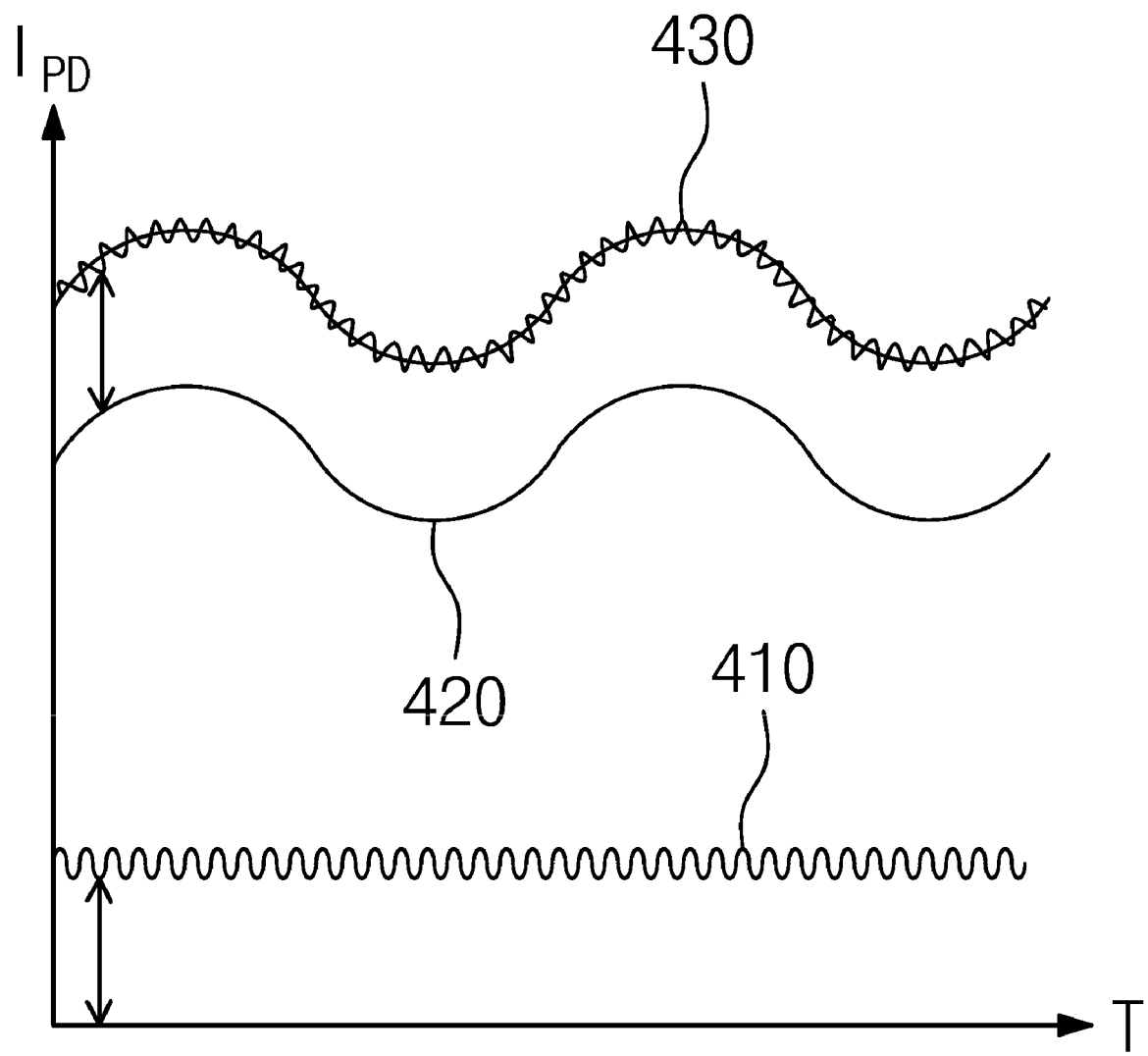
FIG. 4 is a graph showing a current flowing through the light-receiving element of the pixel circuit according to a prior art.
Figure 5:
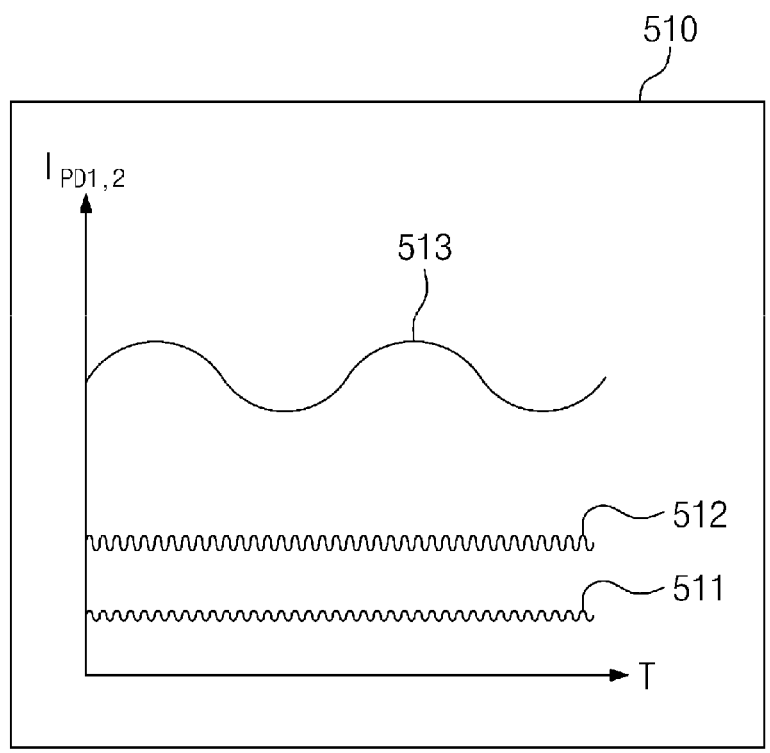
FIG. 5 is a graph showing a current flowing through the light-receiving element according to the embodiment of the present disclosure.
Figure 5:
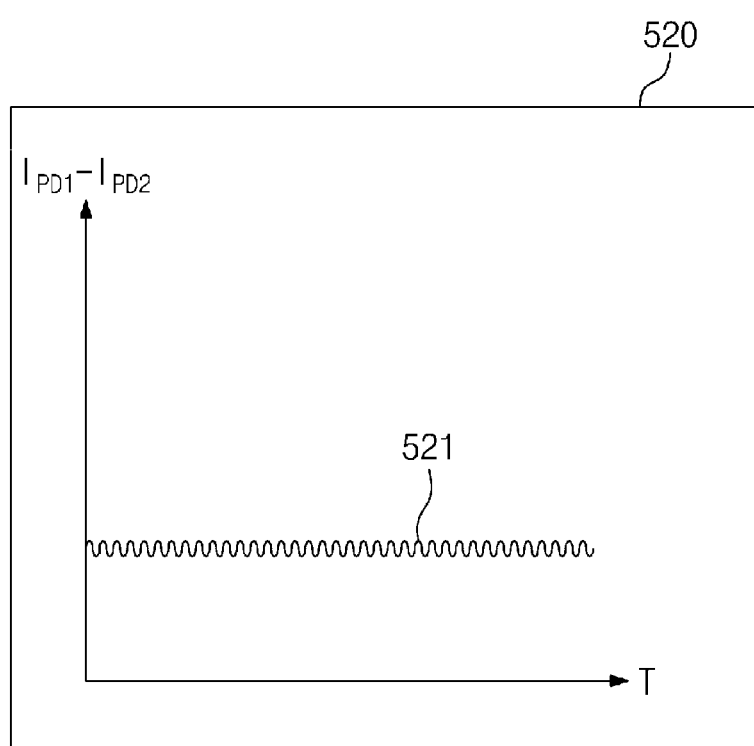

First, for better understanding, prior to the description of FIG. 5, FIG. 4 showing the current flowing through the light-receiving element according to a prior art will be described.

FIG. 4 is a graph showing the current flowing through the light-receiving element of the pixel circuit according to a prior art.

In FIG. 4, the horizontal axis represents time and the vertical axis represents the current flowing through the light-receiving element. A fingerprint light current 410 represents a current generated by the light-receiving element on the basis of the light reflected from the fingerprint. A direct light current 420 represents a current generated from the light-receiving element by the light by the self-light emitting element or the light from the outside. Since the light by the self-light emitting element or the light from the outside is stronger than the light reflected from the fingerprint, the direct light current 420 may be greater than the fingerprint light current 410. The direct light current 420 may ripple by noise. A resultant current 430 represents the sum of the fingerprint light current 410 and the direct light current 420.

Since the direct light current 420 is greater than the fingerprint light current 410, the direct light current 420 may have a greater effect on the resultant current 430 than the fingerprint light current 410. Also, the direct light current 420 may be greatly influenced by noise. Also, since the direct light current 420 has a large magnitude, clipping may occur.

FIG. 5 is a graph showing the current flowing through the light-receiving element according to the embodiment of the present disclosure.

The horizontal axis of a graph 510 represents time. The vertical axis of the graph 510 represents the current flowing through the first light-receiving element 311 and the second light-receiving element 312. A second fingerprint light current 511 represents a current generated by the second light-receiving element 312 on the basis of the light reflected from the fingerprint. A first fingerprint light current 512 represents a current generated by the first light-receiving element 311 on the basis of the light reflected from the fingerprint. Although a distance between the first light-receiving element 311 and the second light-receiving element 312 is small, the valleys and ridges of the fingerprint are also fine. Accordingly, the first fingerprint light current 512 generated by the first light-receiving element 311 may be different from the second fingerprint light current 511 generated by the second light-receiving element 312.

A direct light current 513 represents a current generated from the first light-receiving element 311 and the second light-receiving element 312 by the light by the self-light emitting element or the light from the outside. The currents generated from the first light-receiving element 311 and the second light-receiving element 312 by the light by the self-light emitting element or the light from the outside may be the same. The light by the self-light emitting element or the light from the outside is stronger than the light reflected from the fingerprint. Accordingly, the direct light current 513 may be greater than the second fingerprint light current 511 or the first fingerprint light current 512. The direct light current 513 may ripple by noise.

A total current flowing through the first light-receiving element 311 may be the sum of the first fingerprint light current 512 and the direct light current 513. A total current flowing through the second light-receiving element 312 may be the sum of the second fingerprint light current 511 and the direct light current 513.

The horizontal axis of a graph 520 represents time. The vertical axis of the graph 520 represents a difference between the current flowing through the first light-receiving element 311 and the current flowing through the second light-receiving element 312. The direct light currents 513 flows in common through the first light-receiving element 311 and the second light-receiving element 312 and thus may cancel each other out. Therefore, a differential signal 521 may not be affected by the direct light current 513. Also, the differential signal 521 may be smaller in size than the resultant current 430. The differential signal 521 may charge or discharge the capacitor component CINT of FIG. 3.

As described with reference to FIG. 5, the pixel circuit 310 can reduce the effect of a signal, i.e., noise, that is generated from the light by the self-light emitting element or the light from the outside. Also, the pixel circuit 310 can identify the fingerprint on the basis of a signal by the light reflected from the fingerprint. Also, the pixel circuit 310 can reduce noise due to the light by the self-light emitting element or the light from the outside and can prevent clipping. Therefore, the pixel circuit 310 can increase the accuracy of fingerprint identification.

Figure 6:
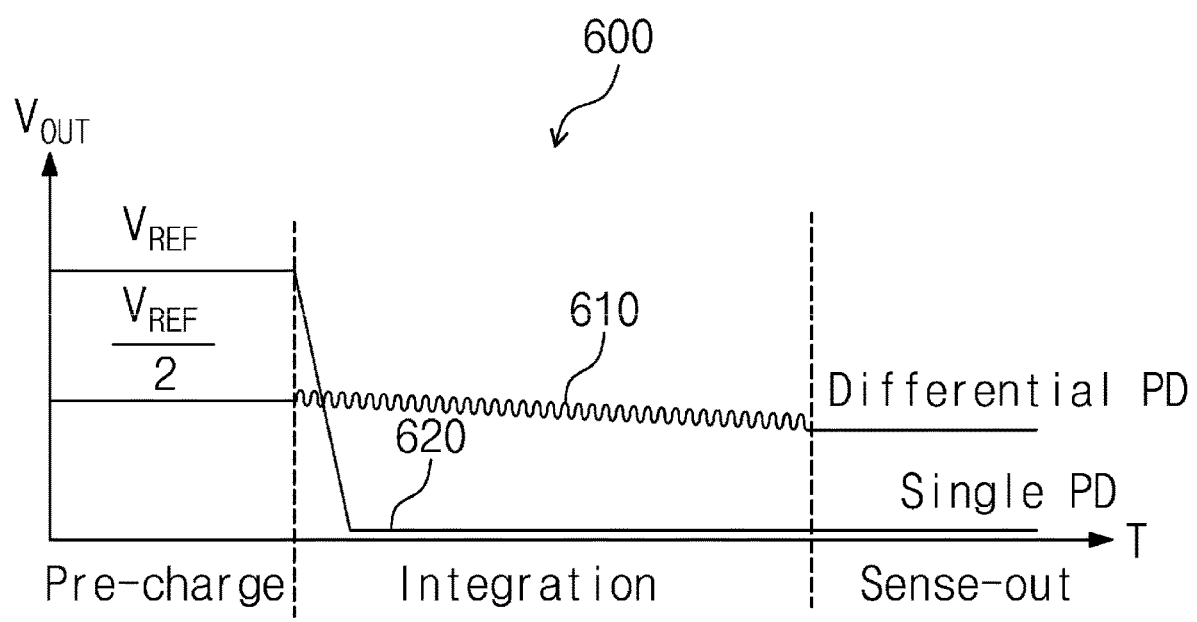
FIG. 6 is a graph showing an output voltage according to the embodiment of the present disclosure.

FIG. 6 is a graph showing the output voltage according to the embodiment of the present disclosure.

The horizontal axis of a graph 600 represents time. The vertical axis of the graph 600 represents the output voltage.

First, the output voltage 620 of a prior art will be described with reference to FIG. 2. The output voltage 620 represents the voltage at the output line OUT of the prior art. In a pre-charge step, the transistor component T1 is in a turned-on state on the basis of a signal of a base terminal, and the light-receiving element is not receiving light. The capacitor component CINT is charged based on VREF. In the pre-charge step, the output voltage 620 of the output line OUT is maintained at VREF.

An integration step is a step in which the light-receiving element receives light. The light-receiving element receives light and generates a current, and discharges electric charges charged in the capacitor component CINT. Also, the transistor component T1 may be turned off. In the integration step, the output voltage 620 may be rapidly reduced. This is because since the direct light current 420 generated from the light-receiving element by the light by the self-light emitting element or the light from the outside is, as described in FIG. 4, large, the capacitor component CINT may be completely discharged. The light by the self-light emitting element or the light from the outside is relatively strong. Therefore, the light reflected from the fingerprint can hardly affect the output voltage 620.

A sense-out step is a step in which a system including the pixel circuit 210 reads the signal of the output line OUT of the pixel circuit 210. With the output voltage 620 kept low, the system including the pixel circuit 210 receives a signal. Since the light reflected from the fingerprint can hardly affect the output voltage 620, the system may have difficulty in sensing the signal generated based on the light by the fingerprint from the output line OUT.

An output voltage 610 according to the embodiment of the present disclosure will be described with reference to FIG. 3. The output voltage 610 represents a voltage at the output line OUT. In the pre-charge step, the transistor component T1 is in a turned-on state on the basis of a signal from the base terminal, and the light-receiving element is not receiving light. The capacitor component CINT is charged based on VREF/2. In the pre-charge step, the output voltage 610 of the output line OUT is maintained at VREF/2.

The integration step is a step in which the light-receiving element receives light. The first light-receiving element 311 and the second light-receiving element 312 receive light and generate a current. Also, the transistor component T1 may be turned off.

As described above, the first light-receiving element 311 and the second light-receiving element 312 may generate currents having different magnitudes by the light reflected from fine valleys or ridges of the fingerprint. The first light-receiving element 311 may charge the capacitor CINT. Also, the second light-receiving element 312 may discharge the capacitor CINT.

The current flowing through the capacitor component CINT may be a differential signal between the first signal generated by the first light-receiving element 311 and the second signal generated by the second light-receiving element 312. As described above in FIG. 5, the first signal and the second signal are affected in common by the light by the self-light emitting element and the light from the outside. Therefore, the differential signal based on the first signal and the second signal may not be affected by the light by the self-light emitting element and the light from the outside. The magnitude of the differential signal may be smaller than the magnitude of the current generated by the light-receiving element on the basis of the light by the self-light emitting element and the light from the outside. Therefore, the output voltage 610 based on the capacitor component CINT may gradually increase or decrease due to the differential signal.

When the first signal generated by the first light-receiving element 311 is greater than the second signal generated by the second light-receiving element 312, the capacitor CINT may be charged because a current will flow through the capacitor CINT. Therefore, the output voltage 610 may gradually increase. Conversely, when the first signal generated by the first light-receiving element 311 is smaller than the second signal generated by the second light-receiving element 312, the capacitor CINT may be discharged because the current will be supplied from the capacitor component CINT. Therefore, the output voltage 610 may be gradually lowered.

The sense-out step is a step in which the system including the pixel circuit 310 reads the signal of the output line OUT of the pixel circuit 310. When the output voltage 610 is higher than VREF/2, the system may determine that the first light-receiving element 311 has received more light than the second light-receiving element 312. Also, when the output voltage 610 is less than VREF/2, the system may determine that the first light-receiving element 311 has received less light than the second light-receiving element 312. The system can accurately identify the fingerprint on the basis of the output voltage 610.

Embodiment 1

Figure 7:
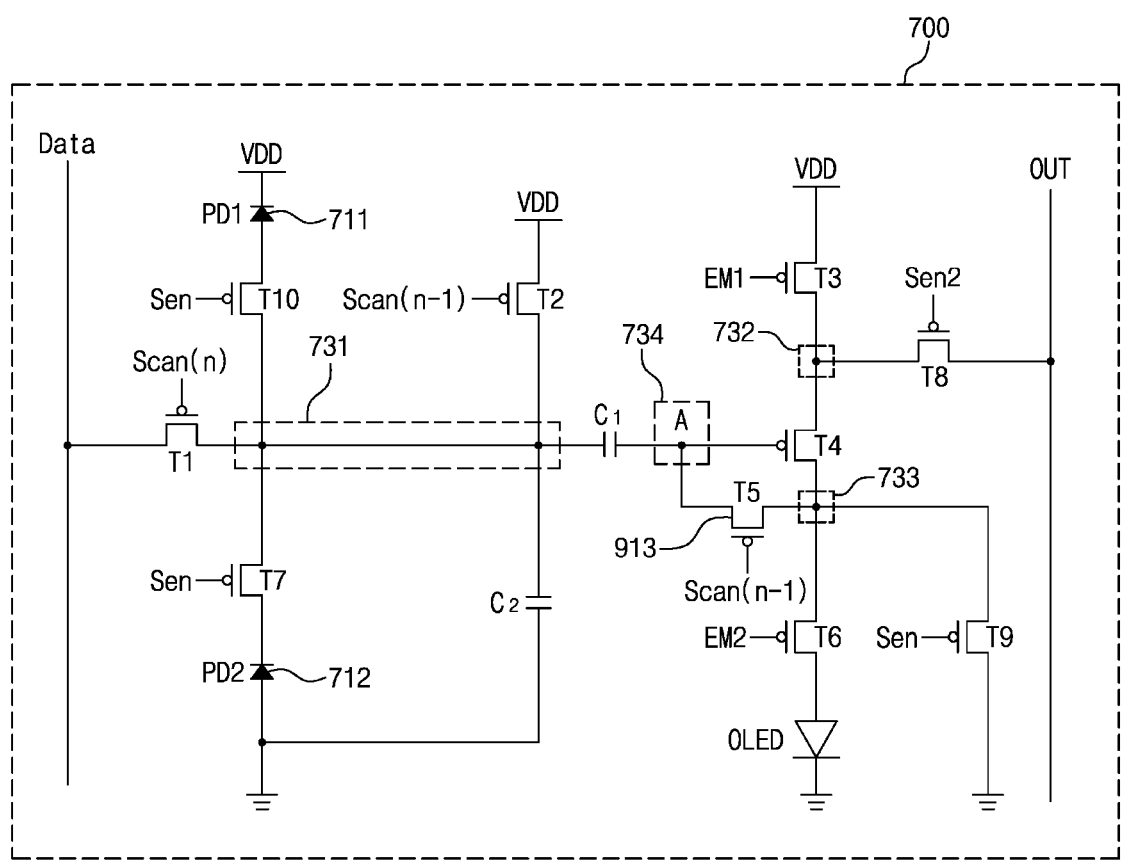
FIG. 7 shows a pixel circuit according to the embodiment of the present disclosure.

FIG. 7 shows the pixel circuit according to the embodiment of the present disclosure.

The pixel circuit 700 may include a first light-receiving element 711 and a second light-receiving element 712. Also, the pixel circuit 700 may include a pixel control circuit. The pixel control circuit may further include a first transistor T1, a second transistor T4, a third transistor T5, a fourth transistor T7, a fifth transistor T10, a sixth transistor T9, and a seventh transistor T8, a first capacitor C1 and a second capacitor C2.

A first terminal or a second terminal of the transistors may be a source terminal or a drain terminal. The transistors may be turned on or off according to a signal of a gate terminal.

The first terminal of the first transistor T1 may be connected to a data line, the second terminal of the first transistor may be connected to a first node 731, and the gate terminal of the first transistor T1 may be connected to an n-th scan line Scan(n).

The first terminal of the second transistor T4 may be connected to a second node 732, the second terminal of the second transistor T4 may be connected to a third node 733, and the gate terminal of the second transistor T4 may be connected to a fourth node 734.

The first terminal of the third transistor T5 may be connected to the fourth node 734, the second terminal of the third transistor T5 may be connected to the third node 733, and the gate terminal of the third transistor T5 may be connected to an (n−1)-th scan line Scan(n−1).

The first terminal of the fourth transistor T7 may be connected to the first node 731, the second terminal of the fourth transistor T7 may be connected to a cathode terminal of the second light-receiving element 712, and the gate terminal of the fourth transistor T7 may be connected to a first sensing line Sen.

The first terminal of the fifth transistor T10 may be connected to an anode terminal of the first light-receiving element 711, the second terminal of the fifth transistor T10 may be connected to the first node 731, and the gate terminal of the fifth transistor T10 may be connected to the first sensing line Sen.

The first terminal of the sixth transistor T9 may be connected to the third node 733, the second terminal of the sixth transistor T9 may be grounded, and the gate terminal of the sixth transistor T9 may be connected to the first sensing line Sen.

The first terminal of the seventh transistor T8 may be connected to the second node 732, the second terminal of the seventh transistor T8 may be connected to an output line OUT, and the gate terminal of the seventh transistor T8 may be connected to a second sensing line Sen2.

The first terminal of the first capacitor C1 may be connected to the first node 731, and the second terminal of the first capacitor C1 may be connected to the fourth node 734.

The first terminal of the second capacitor C2 may be connected to the first node 731, and the second terminal of the second capacitor C2 may be grounded.

A cathode terminal of the first light-receiving element 711 may be connected to a power supply VDD, and the second light-receiving element 712 may be grounded.

The pixel control circuit may further include an eighth transistor T2, a ninth transistor T3, a tenth transistor T6, and a self-light emitting element OLED.

The first terminal of the eighth transistor T2 may be connected to the power supply VDD, the second terminal of the eighth transistor T2 may be connected to the first node 731, and the gate terminal of the eighth transistor T2 may be connected to the (n−1)-th scan line Scan(n−1).

The first terminal of the ninth transistor T3 may be connected to the power supply, the second terminal of the ninth transistor T3 may be connected to the second node 732, and the gate terminal of the ninth transistor T3 may be connected to a first emission line EM1.

The first terminal of the tenth transistor T6 may be connected to the third node 733, the second terminal of the tenth transistor T6 may be connected to an anode terminal of the self-light emitting element OLED, and the gate terminal of the tenth transistor T6 may be connected to a second emission line EM2.

A cathode terminal of the self-light emitting element OLED may be grounded.

Embodiment 2

Figure 8:
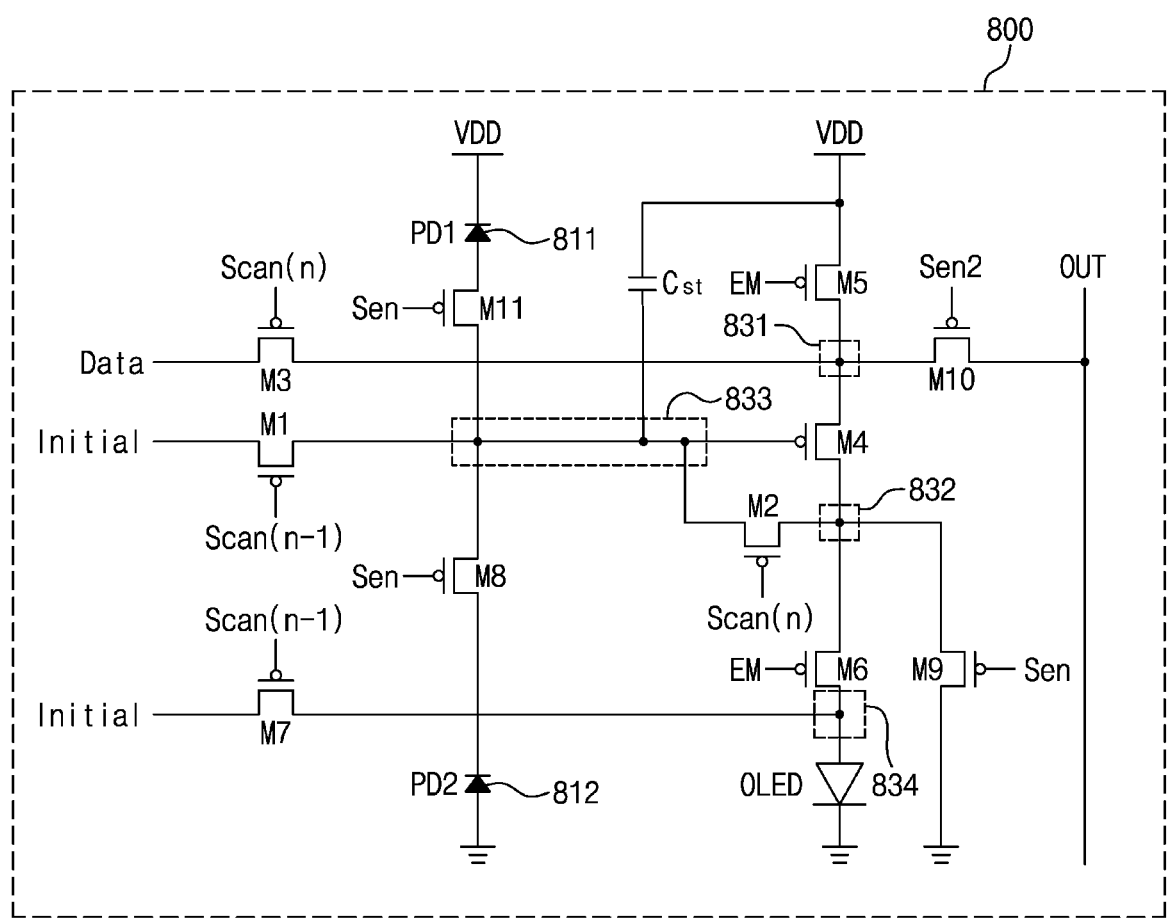
FIG. 8 shows a pixel circuit according to the embodiment of the present disclosure.

FIG. 8 shows a pixel circuit according to the embodiment of the present disclosure.

The pixel circuit 800 of FIG. 8 has a structure capable of differential optical fingerprint sensing by adding transistors and optical sensors to an optical fingerprint sensing pixel circuit using internal compensation.

The pixel circuit 800 may include a first light-receiving element 811 and a second light-receiving element 812. Also, the pixel circuit 800 may include a pixel control circuit. The pixel control circuit may further include a first transistor M3, a second transistor M4, a third transistor M2, a fourth transistor M8, a fifth transistor M11, a sixth transistor M9, and a seventh transistor M10.

The first terminal of the first transistor M3 may be connected to a data line Data, the second terminal of the first transistor M3 may be connected to a first node 831, and the gate terminal of the first transistor M3 may be connected to an n-th scan line Scan(n).

The first terminal of the second transistor M4 may be connected to the first node 831, the second terminal of the second transistor M4 may be connected to a second node 832, and the gate terminal of the second transistor M4 may be connected to a third node 833.

The first terminal of the third transistor M2 may be connected to the third node 833, the second terminal of the third transistor M2 may be connected to the second node 832, and the gate terminal of the third transistor M2 may be connected to the n-th scan line Scan(n).

The first terminal of the fourth transistor M8 may be connected to the third node 833, the second terminal of the fourth transistor M8 may be connected to a cathode terminal of the second light-receiving element 812, and the gate terminal of the fourth transistor M8 may be connected to the first sensing line Sen.

The first terminal of the fifth transistor M11 may be connected to an anode terminal of the first light-receiving element 811, the second terminal of the fifth transistor M11 may be connected to the third node 833, and the gate terminal of the fifth transistor M11 may be connected to the first sensing line Sen.

The first terminal of the sixth transistor M9 may be connected to the second node 832, the second terminal of the sixth transistor M9 may be grounded, and the gate terminal of the sixth transistor M9 may be connected to the first sensing line Sen.

The first terminal of the seventh transistor M10 may be connected to the first node 831, the second terminal of the seventh transistor M10 may be connected to an output line OUT, and the gate terminal of the seventh transistor M10 may be connected to a second sensing line Sen2.

A cathode terminal of the first light-receiving element 811 may be connected to a power supply VDD, and an anode terminal of the second light-receiving element 812 may be grounded.

The pixel control circuit may further include an eighth transistor M1, a ninth transistor M7, a tenth transistor M5, an eleventh transistor M6, a capacitor CST, and a self-light emitting element OLED.

The first terminal of the eighth transistor M1 may be connected to an initialization line Initial, the second terminal of the eighth transistor M1 may be connected to the third node 833, and the gate terminal of the eighth transistor M1 may be connected to an (n−1)-th scan line Scan(n−1).

The first terminal of the ninth transistor M7 may be connected to the initialization line Initial, the second terminal of the ninth transistor M7 may be connected to an anode terminal of the self-light emitting element OLED, and the gate terminal of the ninth transistor M7 may be connected to the (n−1)-th scan line Scan(n−1).

The first terminal of the tenth transistor M5 may be connected to the power supply, the second terminal of the tenth transistor M5 may be connected to the first node 831, and the gate terminal of the tenth transistor M5 may be connected to an emission line EM.

The first terminal of the eleventh transistor M6 may be connected to the second node 832, the second terminal of the eleventh transistor M6 may be connected to the anode terminal of the self-light emitting element OLED, and the gate terminal of the eleventh transistor M6 may be connected to the emission line EM.

The first terminal of the capacitor CST may be connected to the power supply, and the second terminal of the capacitor CST may be connected to the third node 833.

A cathode terminal of the self-light emitting element OLED may be grounded.

The pixel circuit 800 may receive an initialization signal from the initialization line Initial. The pixel circuit may obtain a data signal from the data line Data. The pixel circuit 800 may receive an emission signal from the emission line EM. The pixel circuit 800 may receive an n-th scan signal from the n-th scan line Scan(n). The pixel circuit may receive an (n−1)-th scan signal from the (n−1)-th scan line Scan(n−1). "n" may be a positive integer. "n" may represent a frame of an image to be displayed in the pixel circuit. For example, the n-th scan signal may be a scan signal for an n-th frame.

A system including the pixel circuit 800 may cause the self-light emitting element OLED to emit light by manipulating at least one of the n-th scan signal, the (n−1)-th scan signal, the initialization signal, the data signal, and the emission signal. The system may include a processor or a memory. The processor may manipulate at least one of the n-th scan signal, the (n−1)-th scan signal, the initialization signal, the data signal, and the emission signal in accordance with instructions or data included in the memory.

The system including the pixel circuit 800 may perform resetting a previous frame data on the basis of the initialization signal. The system including the pixel circuit 800 may compensate a threshold voltage Vth of the second transistor M4 on the basis of at least one of the data signal and the n-th scan signal, and may perform applying the data signal. The system including the pixel circuit 800 may perform changing the voltage of the third node 833 on the basis of the currents by the first light-receiving element 811 and the second light-receiving element 812. The system including the pixel circuit 800 may perform transmitting the voltage of the third node 833, i.e., a gate terminal voltage of the second transistor M4, to the first node 831, i.e., the first terminal of the second transistor M4, through a source follower operation. The system including the pixel circuit 800 may perform outputting the voltage of the first node 831 to the output line OUT.

The system including the pixel circuit 800 may perform resetting a previous frame data. The eighth transistor M1 and the ninth transistor M7 may operate. The system may transmit at least one of the (n−1)-th scan signal and the initialization signal to the pixel circuit 800. The pixel circuit 800 may receive the (n−1)-th scan signal from the (n−1)-th scan line Scan(n−1). The pixel circuit 800 may receive the initialization signal from the initialization line Initial. Based on the (n−1)-th scan signal and the initialization signal, the eighth transistor M1 and the ninth transistor M7 may reset the previous frame data.

The system including the pixel circuit 800 may performing compensating the threshold voltage Vth of the second transistor M4 and applying the data signal. In the step of applying the data signal, the first transistor M3 and the third transistor M2 may operate. The system may transmit at least one of the n-th scan signal and the data signal to the pixel circuit 800. The pixel circuit 800 may receive the n-th scan signal from the n-th scan line Scan(n). The pixel circuit 800 may receive the data signal from the data line Data. Based on the n-th scan signal, the first transistor M1 may apply the data signal to the first node. Based on the n-th scan signal, the third transistor M3 may compensate the threshold voltage Vth of the second transistor M4.

The system including the pixel circuit 800 may perform an integration phase. The integration phase may include changing the voltage of the third node 833, i.e., the gate terminal of the second transistor M4, on the basis of the currents generated by the first light-receiving element 811 and the second light-receiving element 812. The integration phase may include transmitting the gate terminal voltage of the second transistor M4 to the first node 831, i.e., the first terminal of the second transistor M4 through a source follower operation.

The system including the pixel circuit 800 may transmit a first sensing signal to the pixel circuit 800. The pixel circuit 800 may receive the first sensing signal from the first sensing line Sen. The first light-receiving element 811 and the second light-receiving element 812 may generate a current according to the amount of received light. Based on the first sensing signal, the current by the first light-receiving element 811, and the current by the second light-receiving element 812, the fourth transistor M8 and the fifth transistor M11 may apply a voltage to the third node 833.

The voltage applied to the third node 833 by the source follower operation of the second transistor M4 may be transmitted to the first node 831.

The system including the pixel circuit 800 may perform outputting the voltage of the first node 831 to the output line OUT. The system may transmit a second sensing signal to the pixel circuit 800. The pixel circuit 800 may receive the second sensing signal from the second sensing line Sen2. Based on the second sensing signal, the seventh transistor M10 may output the voltage of the first node 831 to the output line OUT. The system may receive the output of the pixel circuit 800 as data. Also, the system may identify fingerprints on the basis of data received from a plurality of pixel circuits.

Embodiment 3

Figure 9:
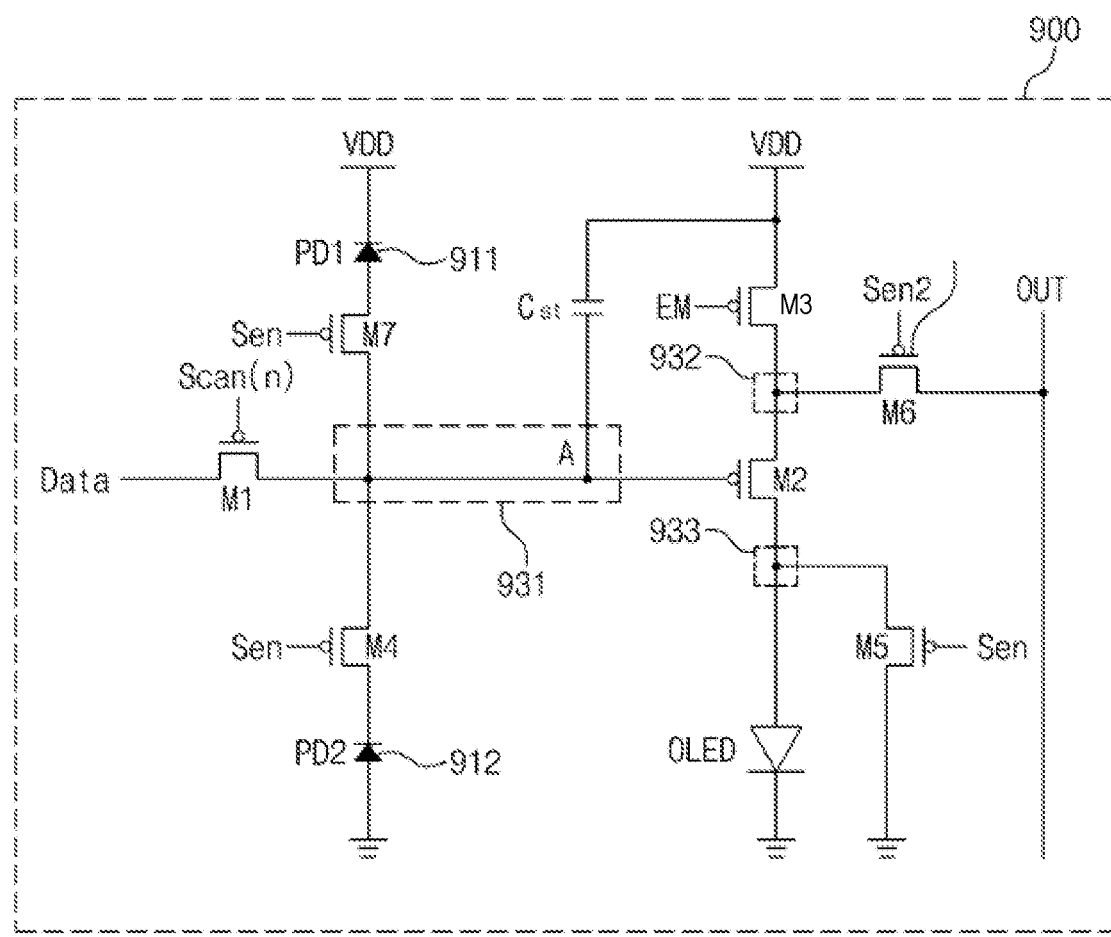
FIG. 9 shows a pixel circuit according to the embodiment of the present disclosure.

FIG. 9 shows a pixel circuit according to the embodiment of the present disclosure.

The pixel circuit 900 of FIG. 9 has a structure capable of differential optical fingerprint sensing by adding transistors and optical sensors to an optical fingerprint sensing pixel circuit using external compensation.

The pixel circuit 900 may include a first light-receiving element 911 and a second light-receiving element 912. Also, the pixel circuit 900 may include a pixel control circuit. The pixel control circuit may include a first transistor M1, a second transistor M2, a third transistor M4, a fourth transistor M7, a fifth transistor M5, and a sixth transistor M6.

The first terminal of the first transistor M1 may be connected to a data line Data, the second terminal of the first transistor M1 may be connected to a first node 931, and the gate terminal of the first transistor M1 may be connected to the n-th scan line Scan(n).

The first terminal of the second transistor M2 may be connected to a second node 932, the second terminal of the second transistor M2 may be connected to a third node 933, and the gate terminal of the second transistor M2 may be connected to the first node 931.

The first terminal of the third transistor M4 may be connected to the first node 931, the second terminal of the third transistor M4 may be connected to a cathode terminal of the second light-receiving element 912, and the gate terminal of the third transistor M4 may be connected to a first sensing line Sen.

The first terminal of the fourth transistor M7 may be connected to an anode terminal of the first light-receiving element 911, the second terminal of the fourth transistor M7 may be connected to the first node 931, and the gate terminal of the fourth transistor M7 may be connected to the first sensing line Sen.

The first terminal of the fifth transistor M5 may be connected to the third node 933, the second terminal of the fifth transistor M5 may be grounded, and the gate terminal of the fifth transistor M5 may be connected to the first sensing line Sen.

The first terminal of the sixth transistor M6 may be connected to the second node 932, the second terminal of the sixth transistor M6 may be connected to an output line OUT, and the gate terminal of the sixth transistor M6 may be connected to a second sensing line Sen2.

A cathode terminal of the first light-receiving element 911 may be connected to a power supply VDD, and an anode terminal of the second light-receiving element 912 may be grounded.

The pixel control circuit may further include a seventh transistor M3, a capacitor CST, and a self-light emitting element OLED.

The first terminal of the seventh transistor M3 may be connected to the power supply VDD, the second terminal of the seventh transistor M3 may be connected to the second node 932, and the gate terminal of the seventh transistor M3 may be connected to an emission line EM.

The first terminal of the capacitor CST may be connected to the power supply VDD, and the second terminal of the capacitor CST may be connected to the first node 931.

An anode terminal of the self-light emitting element OLED may be connected to the third node 933, and a cathode terminal of the self-light emitting element OLED may be grounded.

Figure 10:
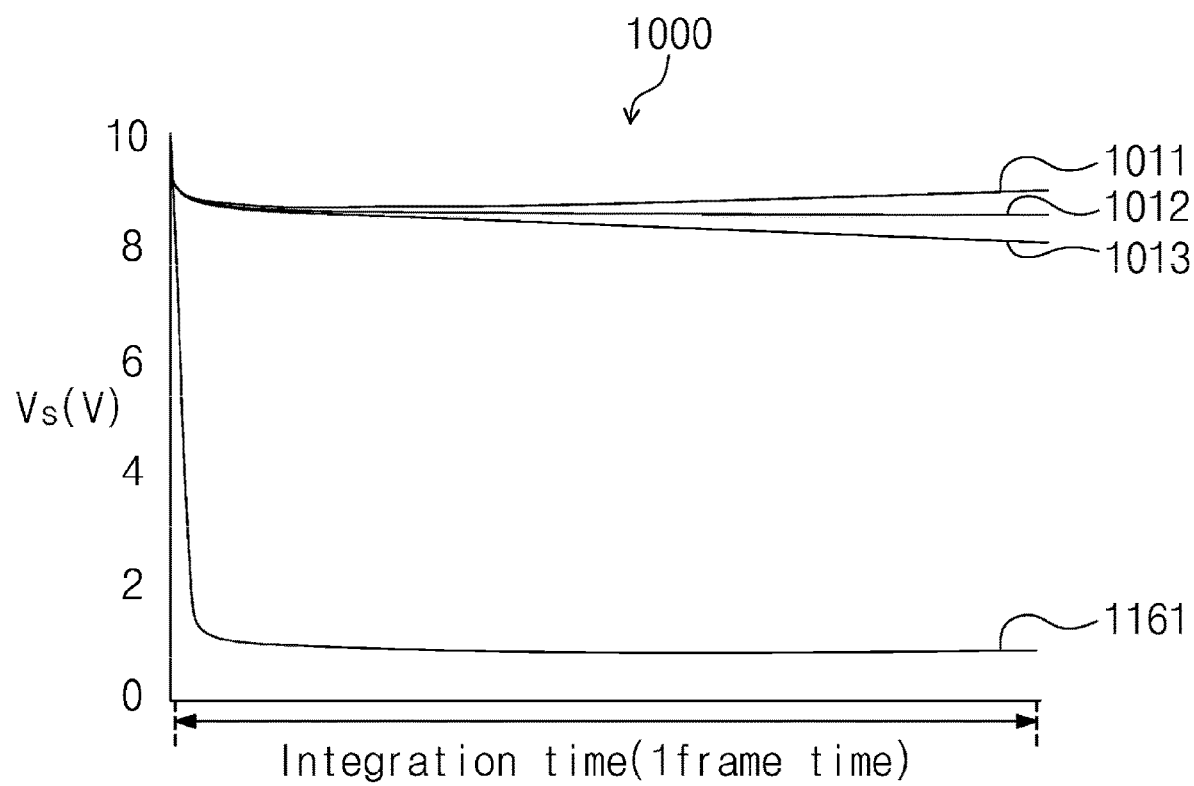
FIG. 10 is a graph showing a voltage of a first node according to the embodiment of the present disclosure.

FIG. 10 is a graph showing an output voltage according to the embodiment of the present disclosure.

Hereinafter, FIG. 10 will be described with reference to FIG. 8. The horizontal axis of a graph 1000 represents time. Also, the horizontal axis of the graph may represent one frame time of the integration phase. The vertical axis of the graph 1000 represents the voltage of the first node 831. The graph 1000 may represent a case where a ratio of low temperature poly silicon (LTPS) thin film transistor (TFT) leakage, the direct light, and the light reflected from the fingerprint is 1:100:0.1. The direct light may include offset and noise.

According to a prior art which uses only one light-receiving element, the light by the self-light emitting element and the light from the outside are so strong that the voltage may be as shown by a line 1061 regardless of whether there is light from the fingerprint. Therefore, the system including the pixel circuit may have a low accuracy of fingerprint sensing. However, the pixel circuit 800 according to the embodiment of the present disclosure can increase the accuracy of fingerprint sensing as described below.

A line 1011 represents a case where the light reflected from the fingerprint is received only in the first light-receiving element 811 in the integration phase. That is, the second light-receiving element 812 has too little light reflected from the fingerprint, so that the amount of light converges to almost zero.

The first light-receiving element 811 may generate the first signal based on the light reflected from the fingerprint (fingerprint light), the light by the self-light emitting element, and the light from the outside (direct light). Since the second light-receiving element 812 did not receive the light reflected from the fingerprint (fingerprint light), the second light-receiving element 812 may generate the second signal based on the light by the self-light emitting element and the light from the outside (direct light). Since the second signal does not include the fingerprint light, the first signal may have a greater value than the second signal. The differential signal between the first signal and the second signal may charge the capacitor CST. The voltage of the third node 833 may gradually increase. The voltage of the first node 831 may also gradually increase due to the source follower operation of the second transistor M4. Accordingly, the voltage of the first node 831 may be as shown by the line 1011.

A line 1012 represents a case where the first light-receiving element 811 and the second light-receiving element 812 have too little light reflected from the fingerprint so that the amount of light converges to almost zero in the integration phase. For example, the fingerprint may not reflect the light due to too dark valley of the fingerprint, and the first light-receiving element 811 and the second light-receiving element 812 may not be able to receive the light from the fingerprint.

Since there is no light from the fingerprint, the first light-receiving device 811 may generate the first signal based on the light by the self-light emitting element and the light from the outside (direct light). Likewise, the second light-receiving element 812 may generate the second signal based on the light by the self-light emitting element and the light from the outside (direct light). The differential signal between the first signal and the second signal may be almost equal to zero. Accordingly, the voltage of the third node 833 may hardly be changed. The voltage of the first node 831 may also not be changed by the source follower operation of the second transistor M4. Accordingly, the voltage of the first node 831 may be as shown by the line 1012.

A line 1013 represents a case where the light reflected from the fingerprint is received only in the second light-receiving element 812 in the integration phase. The first light-receiving element 811 has too little light reflected from the fingerprint, so that the amount of light may converge to almost zero. For example, the fingerprint reflects light due to the bright ridge of the fingerprint, and the second light-receiving element 812 may receive the light reflected from the fingerprint. Also, the fingerprint may not reflect the light due to too dark valley of the fingerprint, and as a result, the second light-receiving element 812 may not be able to receive the light from the fingerprint.

The second light-receiving element 812 may generate the second signal based on the light reflected from the fingerprint (fingerprint light), the light by the self-light emitting element, and the light from the outside (direct light). Since the first light-receiving element 811 did not receive the light reflected from the fingerprint (fingerprint light), the first light-receiving element 811 may generate the first signal based on the light by the self-light emitting element and the light from the outside (direct light). The second signal may have a greater value than the first signal by the light from the fingerprint. The differential signal between the first signal and the second signal may discharge the capacitor CST. The voltage of the third node 833 may gradually decrease. The voltage of the first node 831 may also gradually decrease due to the source follower operation of the second transistor M4. Accordingly, the voltage of the first node 831 may be as shown by the line 1013.

The voltage of the first node 831 may be transmitted to the output line OUT by the operation of the seventh transistor M10. The system may perform fingerprint identification on the basis of the output signal transmitted from the output line OUT. Since the voltage of the first node 831 changes depending on whether the first light-receiving element 811 and the second light-receiving element 812 have received the light from the fingerprint, the system including the pixel circuit 800 can accurately identify the fingerprint.

Also, the pixel circuit 800 can reduce the effect of the light by the self-light emitting element and the light from the outside and the effect of noise. Also, the pixel circuit 800 can prevent clipping due to the light by the self-light emitting element and the light from the outside. Also, since the pixel circuit 800 can perform fingerprint identification by using only the light reflected by the fingerprint (fingerprint light), the signal noise ratio (SNR) can be increased.

Figure 11:
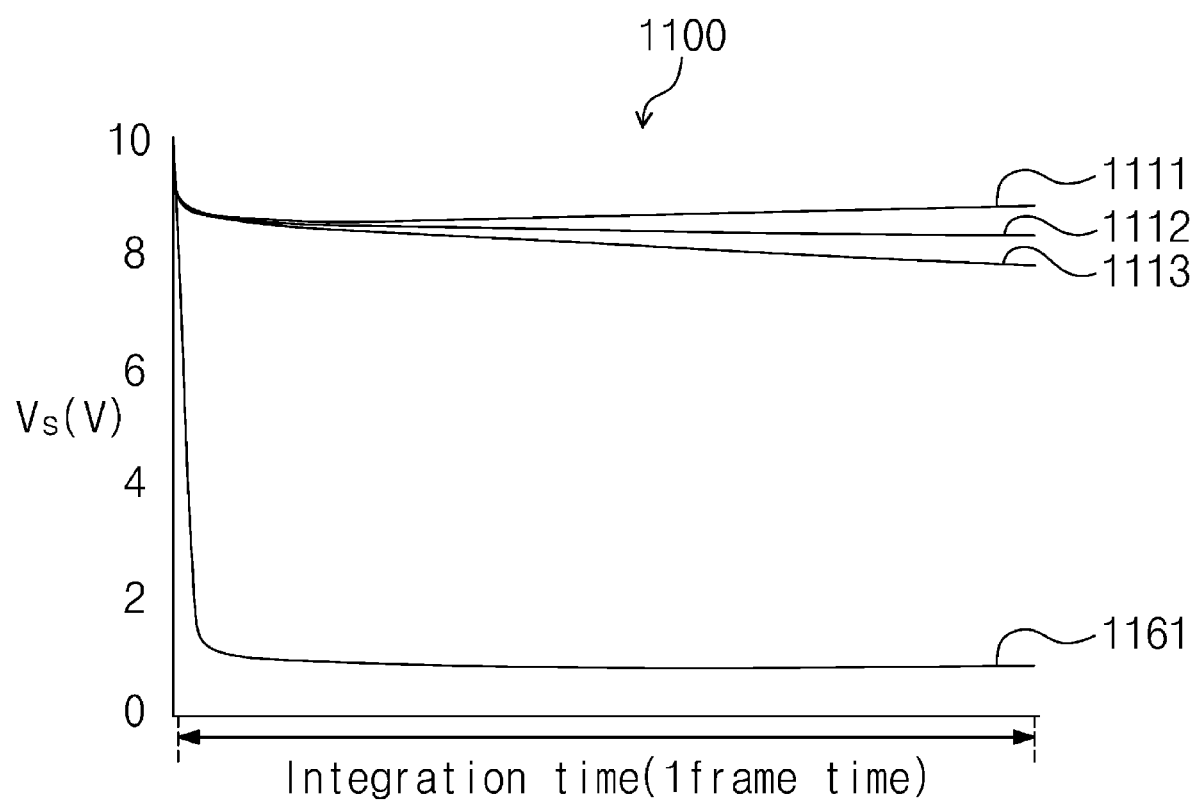
FIG. 11 is a graph showing a voltage of a first node according to the embodiment of the present disclosure.

FIG. 11 is a graph showing an output voltage according to the embodiment of the present disclosure.

Hereinafter, FIG. 11 will be described with reference to FIG. 8. The horizontal axis of a graph 1100 represents time. Also, the horizontal axis of the graph may represent one frame time of the integration phase. The vertical axis of the graph 1100 represents the voltage of the first node 831. The graph 1100 may represent a case where a ratio of low temperature poly silicon (LTPS) thin film transistor (TFT) leakage, the direct light, and the light reflected from the fingerprint is 1:100:0.1. The direct light may include offset and noise.

According to a prior art which uses only one light-receiving element, the light by the self-light emitting element and the light from the outside are so strong that the voltage may be as shown by a line 1161 regardless of whether there is light reflected from the fingerprint. Therefore, the system including the pixel circuit may have a low accuracy of fingerprint sensing. However, the pixel circuit 800 according to the embodiment of the present disclosure can increase the accuracy of fingerprint sensing as described below.

A line 1111 represents a case where the first light-receiving element 811 receives more light reflected from the fingerprint than the second light-receiving element 812 in the integration phase. For example, the line 1111 may represent a case where the first light-receiving element 811 receives light reflected by a bright portion of the fingerprint and the second light-receiving element 812 receives light reflected by a dark portion of the fingerprint.

The first light-receiving element 811 may generate the first signal based on the light reflected from the fingerprint (fingerprint light), the light by the self-light emitting element, and the light from the outside (direct light). Likewise, the second light-receiving element 812 may generate the second signal based on the light reflected from the fingerprint (fingerprint light), the light by the self-light emitting element, and the light from the outside (direct light). Since the first light-receiving element 811 has received more light reflected from the fingerprint than the second light-receiving element 812, the first signal may have a greater value than the second signal. The differential signal between the first signal and the second signal may charge the capacitor CST. The voltage of the third node 833 may gradually increase. The voltage of the first node 831 may also gradually increase due to the source follower operation of the second transistor M4. Accordingly, the voltage of the first node 831 may be as shown by the line 1111.

A line 1112 may represent a case where the magnitudes of the fingerprint light (light reflected from the fingerprint) received by the first light-receiving element 811 and the second light-receiving element 812 are the same in the integration phase.

The first light-receiving element 811 may generate the first signal based on the light reflected from the fingerprint (fingerprint light), the light by the self-light emitting element, and the light from the outside (direct light). Likewise, the second light-receiving element 812 may generate the second signal based on the light reflected from the fingerprint (fingerprint light), the light by the self-light emitting element, and the light from the outside (direct light). The differential signal between the first signal and the second signal may be almost equal to zero. Accordingly, the voltage of the third node 833 may hardly be changed. The voltage of the first node 831 may also not be changed by the source follower operation of the second transistor M4. Accordingly, the voltage of the first node 831 may be as shown by the line 1112.

A line 1113 represents a case where the first light-receiving element 811 receives less light reflected from the fingerprint than the second light-receiving element 812 in the integration phase. For example, the line 1113 may represent a case where the first light-receiving element 811 receives light reflected by a dark portion of the fingerprint and the second light-receiving element 812 receives light reflected by a bright portion of the fingerprint.

The first light-receiving element 811 may generate the first signal based on the light reflected from the fingerprint (fingerprint light), the light by the self-light emitting element, and the light from the outside (direct light). Likewise, the second light-receiving element 812 may generate the second signal based on the light reflected from the fingerprint (fingerprint light), the light by the self-light emitting element, and the light from the outside (direct light). Since the first light-receiving element 811 has received less light reflected from the fingerprint than the second light-receiving element 812, the first signal may have a smaller value than the second signal. The differential signal between the first signal and the second signal may discharge the capacitor CST. The voltage of the third node 833 may gradually decrease. The voltage of the first node 831 may also gradually decrease due to the source follower operation of the second transistor M4. Accordingly, the voltage of the first node 831 may be as shown by the line 1113.

The voltage of the first node 831 may be transmitted to the output line OUT by the operation of the seventh transistor M10. The system may perform fingerprint identification on the basis of the output signal transmitted from the output line OUT. Since the voltage of the first node 831 changes depending on whether the first light-receiving element 811 and the second light-receiving element 812 have received the light from the fingerprint, the system including the pixel circuit 800 can accurately identify the fingerprint.

Also, the pixel circuit 800 can reduce the effect of the light by the self-light emitting element and the light from the outside and the effect of noise. Also, the pixel circuit 800 can prevent clipping due to the light by the self-light emitting element and the light from the outside. Also, since the pixel circuit 800 can perform fingerprint identification by using only the light reflected by the fingerprint, the signal noise ratio (SNR) can be increased.

Up to now, various embodiments of the present invention have been described. It can be understood by those skilled in the art that many alternatives, modifications, and variations of the present disclosure can be made without departing from the essential features of the present disclosure. Therefore, the disclosed embodiments are merely exemplary and are not to be construed as limiting the present invention. The scope of the present disclosure is shown in the appended claims and not in the foregoing descriptions. It should be construed that all differences within the scope equivalent to that of the claims are included in the present disclosure.

Meanwhile, the above-described embodiments of the present disclosure can be written as a program that can be executed in a computer, and can be implemented in a general-purpose digital computer that operates the program by using a computer-readable recording medium. The computer-readable recording medium includes a storage medium such as a magnetic storage medium (e.g., ROM, floppy disk, hard disk, etc.), and an optical reading medium (e.g., CD-ROM, DVD, etc.).

What is claimed is:

1. A pixel circuit comprising an optical fingerprint sensing circuit, the pixel circuit comprising:
   a self-light emitting element which displays an image by emitting visible light in a visible spectrum;
   a light-receiving element which receives the visible light emitted from the self-light emitting element and reflected from a fingerprint of a user and converts it into a photocurrent; and
   a pixel control circuit,
      wherein the light-receiving element comprises a first light-receiving element which generates a first signal responsive to receiving the visible light in the visible spectrum and a second light-receiving element which generates a second signal responsive to receiving the visible light in the visible spectrum while the self-light emitting element emits the visible light in the visible spectrum, and wherein the pixel control circuit generates an output signal where a noise signal is removed based on a difference between the first signal and the second signal, the pixel control circuit comprising at least one transistor component and at least one capacitor component.

2. The pixel circuit of claim 1, wherein the pixel control circuit further comprises a first transistor, a second transistor, a third transistor, a fourth transistor, a fifth transistor, a sixth transistor, a seventh transistor, a first capacitor, and a second capacitor, wherein a first terminal of the first transistor is connected to a data line, a second terminal of the first transistor is connected to a first node, and a gate terminal of the first transistor is connected to an n-th scan line, wherein a first terminal of the second transistor is connected to a second node, a second terminal of the second transistor is connected to a third node, and a gate terminal of the second transistor is connected to a fourth node, wherein a first terminal of the third transistor is connected to the fourth node, a second terminal of the third transistor is connected to the third node, and a gate terminal of the third transistor is connected to an (n−1)-th scan line, wherein a first terminal of the fourth transistor is connected to the first node, a second terminal of the fourth transistor is connected to a cathode terminal of the second light-receiving element, and a gate terminal of the fourth transistor is connected to a first sensing line, wherein a first terminal of the fifth transistor is connected to an anode terminal of the first light-receiving element, a second terminal of the fifth transistor is connected to the first node, and a gate terminal of the fifth transistor is connected to the first sensing line, wherein a first terminal of the sixth transistor is connected to the third node, a second terminal of the sixth transistor is grounded, and a gate terminal of the sixth transistor is connected to the first sensing line, wherein a first terminal of the seventh transistor is connected to the second node, a second terminal of the seventh transistor is connected to an output line, and a gate terminal of the seventh transistor is connected to a second sensing line, wherein a first terminal of the first capacitor is connected to the first node, and a second terminal of the first capacitor is connected to the fourth node, wherein a first terminal of the second capacitor is connected to the first node, and a second terminal of the second capacitor is grounded, and wherein a cathode terminal of the first light-receiving element is connected to a power supply VDD, and the second light-receiving element is grounded.

3. The pixel circuit of claim 2, wherein the pixel control circuit further comprises an eighth transistor, a ninth transistor, and a tenth transistor, wherein a first terminal of the eighth transistor is connected to the power supply VDD, a second terminal of the eighth transistor is connected to the first node, and a gate terminal of the eighth transistor is connected to the (n−1)-th scan line, wherein a first terminal of the ninth transistor is connected to the power supply, a second terminal of the ninth transistor is connected to the second node, and a gate terminal of the ninth transistor is connected to a first emission line, wherein a first terminal of the tenth transistor is connected to the third node, a second terminal of the tenth transistor is connected to an anode terminal of the self-light emitting element, and a gate terminal of the tenth transistor is connected to a second emission line, and wherein a cathode terminal of the self-light emitting element is grounded.

4. The pixel circuit of claim 1, wherein the pixel control circuit further comprises a first transistor, a second transistor, a third transistor, a fourth transistor, a fifth transistor, a sixth transistor, and a seventh transistor, wherein a first terminal of the first transistor is connected to a data line, a second terminal of the first transistor is connected to a first node, and a gate terminal of the first transistor is connected to an n-th scan line, wherein a first terminal of the second transistor is connected to the first node, a second terminal of the second transistor is connected to a second node, and a gate terminal of the second transistor is connected to a third node, wherein a first terminal of the third transistor is connected to the third node, a second terminal of the third transistor is connected to the second node, and a gate terminal of the third transistor is connected to the n-th scan line, wherein a first terminal of the fourth transistor is connected to the third node, a second terminal of the fourth transistor is connected to a cathode terminal of the second light-receiving element, and a gate terminal of the fourth transistor is connected to a first sensing line, wherein a first terminal of the fifth transistor is connected to an anode terminal of the first light-receiving element, a second terminal of the fifth transistor is connected to the third node, and a gate terminal of the fifth transistor is connected to the first sensing line, wherein a first terminal of the sixth transistor is connected to the second node, a second terminal of the sixth transistor is grounded, and a gate terminal of the sixth transistor is connected to the first sensing line, wherein a first terminal of the seventh transistor is connected to the first node, a second terminal of the seventh transistor is connected to an output line, and a gate terminal of the seventh transistor is connected to a second sensing line, and wherein a cathode terminal of the first light-receiving element is connected to a power supply VDD, and an anode terminal of the second light-receiving element is grounded.

5. The pixel circuit of claim 4, wherein the pixel control circuit further comprises an eighth transistor, a ninth transistor, a tenth transistor, and an eleventh transistor, wherein a first terminal of the eighth transistor is connected to an initialization line, a second terminal of the eighth transistor is connected to the third node, and a gate terminal of the eighth transistor is connected to an (n−1)-th scan line, wherein a first terminal of the ninth transistor is connected to the initialization line, a second terminal of the ninth transistor is connected to an anode terminal of the self-light emitting element, and a gate terminal of the ninth transistor is connected to the (n−1)-th scan line, wherein a first terminal of the tenth transistor is connected to the power supply, a second terminal of the tenth transistor is connected to the first node, and a gate terminal of the tenth transistor is connected to an emission line, wherein a first terminal of the eleventh transistor is connected to the second node, a second terminal of the eleventh transistor is connected to the anode terminal of the self-light emitting element, and a gate terminal of the eleventh transistor is connected to the emission line, wherein a first terminal of the capacitor is connected to the power supply, and a second terminal of the capacitor is connected to the third node, and wherein a cathode terminal of the self-light emitting element is grounded.

6. The pixel circuit of claim 1, wherein the pixel control circuit further comprises a first transistor, a second transistor, a third transistor, a fourth transistor, a fifth transistor, and a sixth transistor, wherein a first terminal of the first transistor is connected to a data line, a second terminal of the first transistor is connected to a first node, and a gate terminal of the first transistor is connected to an n-th scan line, wherein a first terminal of the second transistor is connected to a second node, a second terminal of the second transistor is connected to a third node, and a gate terminal of the second transistor is connected to the first node, wherein a first terminal of the third transistor is connected to the first node, a second terminal of the third transistor is connected to a cathode terminal of the second light-receiving element, and a gate terminal of the third transistor is connected to a first sensing line, wherein a first terminal of the fourth transistor is connected to an anode terminal of the first light-receiving element, a second terminal of the fourth transistor is connected to the first node, and a gate terminal of the fourth transistor is connected to the first sensing line, wherein a first terminal of the fifth transistor is connected to the third node, a second terminal of the fifth transistor is grounded, and a gate terminal of the fifth transistor is connected to the first sensing line, wherein a first terminal of the sixth transistor is connected to the second node, a second terminal of the sixth transistor is connected to an output line, and a gate terminal of the sixth transistor is connected to a second sensing line, and wherein a cathode terminal of the first light-receiving element is connected to a power supply VDD, and an anode terminal of the second light-receiving element is grounded.

7. The pixel circuit of claim 6, wherein the pixel control circuit further comprises a seventh transistor, wherein a first terminal of the seventh transistor is connected to the power supply, a second terminal of the seventh transistor is connected to the second node, and a gate terminal of the seventh transistor is connected to an emission line, wherein a first terminal of the capacitor is connected to the power supply, and a second terminal of the capacitor is connected to the first node, and wherein an anode terminal of the self-light emitting element is connected to the third node, and a cathode terminal of the self-light emitting element is grounded.

8. A pixel circuit comprising an optical fingerprint sensing circuit, the pixel circuit comprising:

a self-light emitting element which displays an image by emitting visible light in a visible spectrum;

a light-receiving element which receives the visible light emitted from the self-light emitting element and reflected from a fingerprint of a user and converts it into a photocurrent; and a pixel control circuit, wherein the light-receiving element comprises a first light-receiving element configured to generate a first signal responsive to the visible light in the visible spectrum and a second light-receiving element configured to generate a second signal responsive to the visible light in the visible spectrum while the self-light emitting element emits the visible light in the visible spectrum, the first light-receiving element connected in series with the second light-receiving element;

and wherein the pixel control circuit generates an output signal based on the first signal and the second signal and comprises at least one transistor component and at least one capacitor component.

9. The pixel circuit of claim 8, wherein the at least one capacitor component is connected to the second light receiving element in parallel.

10. The pixel circuit of claim 8, further comprising:

an output line connected to a node located between the first light receiving element and the second light receiving element, the output line configured to output the output signal.

11. The pixel circuit of claim 8, wherein the output signal is based on a difference between the first signal and the second signal.

12. A pixel circuit comprising an optical fingerprint sensing circuit, the pixel circuit comprising:

a self-light emitting element which displays an image by emitting visible light in a visible spectrum;

a light-receiving element which receives the visible light emitted from the self-light emitting element and reflected from a fingerprint of a user and converts it into a photocurrent; and a pixel control circuit, wherein the light-receiving element comprises a first light-receiving element which generates a first signal responsive to the visible light in the visible spectrum and a second light-receiving element which generates a second signal responsive to the visible light in the visible spectrum while the self-light emitting element emits the visible light in the visible spectrum, wherein the pixel control circuit receives the first signal and the second signal from the light-receiving element, generates an output signal by calculating the first signal and the second signal and comprises at least one transistor component and at least one capacitor component, and wherein the pixel control circuit comprises:

a first transistor connected to a data line, an n-th scan line and second transistor; and the second transistor connected to the first transistor, the first light-receiving element, the second light-receiving element and the self-light emitting element.

13. The pixel circuit of claim 12, wherein the pixel control circuit differentiates the first signal and the second signal and thus generates the output signal where a noise signal has been removed.

14. The pixel circuit of claim 12, wherein the pixel control circuit further comprises the first transistor, the second transistor, a third transistor, a fourth transistor, a fifth transistor, a sixth transistor, a seventh transistor, a first capacitor, and a second capacitor, wherein a first terminal of the first transistor is connected to the data line, a second terminal of the first transistor is connected to a first node, and a gate terminal of the first transistor is connected to the n-th scan line, wherein a first terminal of the second transistor is connected to a second node, a second terminal of the second transistor is connected to a third node, and a gate terminal of the second transistor is connected to a fourth node, wherein a first terminal of the third transistor is connected to the fourth node, a second terminal of the third transistor is connected to the third node, and a gate terminal of the third transistor is connected to an (n−1)-th scan line, wherein a first terminal of the fourth transistor is connected to the first node, a second terminal of the fourth transistor is connected to a cathode terminal of the second light-receiving element, and a gate terminal of the fourth transistor is connected to a first sensing line, wherein a first terminal of the fifth transistor is connected to an anode terminal of the first light-receiving element, a second terminal of the fifth transistor is connected to the first node, and a gate terminal of the fifth transistor is connected to the first sensing line, wherein a first terminal of the sixth transistor is connected to the third node, a second terminal of the sixth transistor is grounded, and a gate terminal of the sixth transistor is connected to the first sensing line, wherein a first terminal of the seventh transistor is connected to the second node, a second terminal of the seventh transistor is connected to an output line, and a gate terminal of the seventh transistor is connected to a second sensing line, wherein a first terminal of the first capacitor is connected to the first node, and a second terminal of the first capacitor is connected to the fourth node, wherein a first terminal of the second capacitor is connected to the first node, and a second terminal of the second capacitor is grounded, and wherein a cathode terminal of the first light-receiving element is connected to a power supply VDD, and the second light-receiving element is grounded.

15. The pixel circuit of claim 14, wherein the pixel control circuit further comprises an eighth transistor, a ninth transistor, and a tenth transistor, wherein a first terminal of the eighth transistor is connected to the power supply VDD, a second terminal of the eighth transistor is connected to the first node, and a gate terminal of the eighth transistor is connected to the (n−1)-th scan line, wherein a first terminal of the ninth transistor is connected to the power supply, a second terminal of the ninth transistor is connected to the second node, and a gate terminal of the ninth transistor is connected to a first emission line, wherein a first terminal of the tenth transistor is connected to the third node, a second terminal of the tenth transistor is connected to an anode terminal of the self-light emitting element, and a gate terminal of the tenth transistor is connected to a second emission line, and wherein a cathode terminal of the self-light emitting element is grounded.

16. The pixel circuit of claim 12, wherein the pixel control circuit further comprises the first transistor, the second transistor, a third transistor, a fourth transistor, a fifth transistor, a sixth transistor, and a seventh transistor, wherein a first terminal of the first transistor is connected to the data line, a second terminal of the first transistor is connected to a first node, and a gate terminal of the first transistor is connected to the n-th scan line, wherein a first terminal of the second transistor is connected to the first node, a second terminal of the second transistor is connected to a second node, and a gate terminal of the second transistor is connected to a third node, wherein a first terminal of the third transistor is connected to the third node, a second terminal of the third transistor is connected to the second node, and a gate terminal of the third transistor is connected to the n-th scan line, wherein a first terminal of the fourth transistor is connected to the third node, a second terminal of the fourth transistor is connected to a cathode terminal of the second light-receiving element, and a gate terminal of the fourth transistor is connected to a first sensing line, wherein a first terminal of the fifth transistor is connected to an anode terminal of the first light-receiving element, a second terminal of the fifth transistor is connected to the third node, and a gate terminal of the fifth transistor is connected to the first sensing line, wherein a first terminal of the sixth transistor is connected to the second node, a second terminal of the sixth transistor is grounded, and a gate terminal of the sixth transistor is connected to the first sensing line, wherein a first terminal of the seventh transistor is connected to the first node, a second terminal of the seventh transistor is connected to an output line, and a gate terminal of the seventh transistor is connected to a second sensing line, and wherein a cathode terminal of the first light-receiving element is connected to a power supply VDD, and an anode terminal of the second light-receiving element is grounded.

17. The pixel circuit of claim 16, wherein the pixel control circuit further comprises an eighth transistor, a ninth transistor, a tenth transistor, and an eleventh transistor, wherein a first terminal of the eighth transistor is connected to an initialization line, a second terminal of the eighth transistor is connected to the third node, and a gate terminal of the eighth transistor is connected to an (n−1)-th scan line, wherein a first terminal of the ninth transistor is connected to the initialization line, a second terminal of the ninth transistor is connected to an anode terminal of the self-light emitting element, and a gate terminal of the ninth transistor is connected to the (n−1)-th scan line, wherein a first terminal of the tenth transistor is connected to the power supply, a second terminal of the tenth transistor is connected to the first node, and a gate terminal of the tenth transistor is connected to an emission line, wherein a first terminal of the eleventh transistor is connected to the second node, a second terminal of the eleventh transistor is connected to the anode terminal of the self-light emitting element, and a gate terminal of the eleventh transistor is connected to the emission line, wherein a first terminal of the capacitor is connected to the power supply, and a second terminal of the capacitor is connected to the third node, and wherein a cathode terminal of the self-light emitting element is grounded.

18. The pixel circuit of claim 12, wherein the pixel control circuit further comprises the first transistor, the second transistor, a third transistor, a fourth transistor, a fifth transistor, and a sixth transistor,
- wherein a first terminal of the first transistor is connected to the data line, a second terminal of the first transistor is connected to a first node, and a gate terminal of the first transistor is connected to the n-th scan line,
- wherein a first terminal of the second transistor is connected to a second node, a second terminal of the second transistor is connected to a third node, and a gate terminal of the second transistor is connected to the first node,
- wherein a first terminal of the third transistor is connected to the first node, a second terminal of the third transistor is connected to a cathode terminal of the second light-receiving element, and a gate terminal of the third transistor is connected to a first sensing line,
- wherein a first terminal of the fourth transistor is connected to an anode terminal of the first light-receiving element, a second terminal of the fourth transistor is connected to the first node, and a gate terminal of the fourth transistor is connected to the first sensing line,
- wherein a first terminal of the fifth transistor is connected to the third node, a second terminal of the fifth transistor is grounded, and a gate terminal of the fifth transistor is connected to the first sensing line,
- wherein a first terminal of the sixth transistor is connected to the second node, a second terminal of the sixth transistor is connected to an output line, and a gate terminal of the sixth transistor is connected to a second sensing line,
- and wherein a cathode terminal of the first light-receiving element is connected to a power supply VDD, and an anode terminal of the second light-receiving element is grounded.

19. The pixel circuit of claim 18, wherein the pixel control circuit further comprises a seventh transistor,
- wherein a first terminal of the seventh transistor is connected to the power supply, a second terminal of the seventh transistor is connected to the second node, and a gate terminal of the seventh transistor is connected to an emission line,
- wherein a first terminal of the capacitor is connected to the power supply, and a second terminal of the capacitor is connected to the first node,
- and wherein an anode terminal of the self-light emitting element is connected to the third node, and a cathode terminal of the self-light emitting element is grounded.

\* \* \* \* \*